(12) United States Patent
Boulter et al.

(10) Patent No.: US 9,269,107 B2
(45) Date of Patent: Feb. 23, 2016

(54) INTERNET RADIO AND BROADCAST METHOD PERSONALIZED BY DJ

(71) Applicant: Pandora Media, Inc., Oakland, CA (US)

(72) Inventors: Jeffrey R. Boulter, Los Angeles, CA (US); Todd M. Beaupre, Los Angeles, CA (US)

(73) Assignee: Pandora Media, Inc., Oakland, CA (US)

( * ) Notice: Subject to any disclaimer, the term of this patent is extended or adjusted under 35 U.S.C. 154(b) by 0 days.

(21) Appl. No.: 14/578,015

(22) Filed: Dec. 19, 2014

(65) Prior Publication Data

US 2015/0106451 A1  Apr. 16, 2015

Related U.S. Application Data

(63) Continuation of application No. 14/195,434, filed on Mar. 3, 2014, which is a continuation of application No. 12/765,525, filed on Apr. 22, 2010, now Pat. No. 8,700,795, which is a continuation-in-part of application No. 09/709,234, filed on Nov. 9, 2000, now Pat. No. 7,711,838.

(60) Provisional application No. 60/164,846, filed on Nov. 10, 1999.

(51) Int. Cl.
*G06F 15/16* (2006.01)
*G06Q 30/06* (2012.01)
(Continued)

(52) U.S. Cl.
CPC .......... *G06Q 30/0641* (2013.01); *G06F 3/0482* (2013.01); *G06F 3/04817* (2013.01); *G06F 3/04842* (2013.01); *G06F 3/04847* (2013.01); *G06F 17/2235* (2013.01); *G06F 17/30053* (2013.01); *G06F 17/30752* (2013.01); *G06F 17/30761* (2013.01); *G06F 17/30772* (2013.01); *G06F 17/30867* (2013.01); *G06F 17/30902* (2013.01); *G06N 5/02* (2013.01); *G06Q 20/123* (2013.01); *H04H 60/46* (2013.01);
(Continued)

(58) Field of Classification Search
CPC .... H04L 65/4076; H04H 60/46; H04H 60/82; H04H 2201/13
See application file for complete search history.

(56) References Cited

U.S. PATENT DOCUMENTS 5,410,344 A   4/1995   Graves et al.
5,675,743 A  10/1997   Mavity
(Continued)

FOREIGN PATENT DOCUMENTS

WO    WO9702537    1/1997

OTHER PUBLICATIONS

European Extended Search Report in EPO application 11190849.7 mailed Apr. 4, 2014.
(Continued)

*Primary Examiner* — Jeong S Park
(74) *Attorney, Agent, or Firm* — Beyer Law Group LLP

(57) ABSTRACT

Data streams are generally selected according to user preferences and transmitted to the user in general alignment with expressed preferences of the user. Such data streams may be music, including music videos. Users may indicate their general or specific preferences with regards to song, artists, or albums. Any other aspects or factors that might affect the user's preferences can be taken into account. A playlist is created that combines all of these factors. The playlist then serves as the basis for feeding the data streams to the user. Each user is able to express his or her own preferences and receive music corresponding to those preferences on an ongoing basis.

28 Claims, 37 Drawing Sheets

(51) Int. Cl.

| | |
|---|---|
| *G06F 17/30* | (2006.01) |
| *H04H 60/46* | (2008.01) |
| *H04H 60/66* | (2008.01) |
| *H04N 21/443* | (2011.01) |
| *H04N 21/45* | (2011.01) |
| *H04N 21/454* | (2011.01) |
| *H04N 21/466* | (2011.01) |
| *H04N 21/475* | (2011.01) |
| *H04N 21/482* | (2011.01) |
| *H04N 21/61* | (2011.01) |
| *H04N 21/81* | (2011.01) |
| *G06N 5/02* | (2006.01) |
| *H04L 29/08* | (2006.01) |
| *G06F 3/0482* | (2013.01) |
| *G06F 3/0484* | (2013.01) |
| *G06F 3/0481* | (2013.01) |
| *G06F 17/22* | (2006.01) |
| *G06Q 20/12* | (2012.01) |
| *H04H 60/82* | (2008.01) |
| *H04L 29/06* | (2006.01) |
| *H04H 20/82* | (2008.01) |
| *H04H 60/06* | (2008.01) |
| *H04N 21/462* | (2011.01) |

(52) U.S. Cl.
CPC .......... *H04H 60/66* (2013.01); *H04L 65/4084* (2013.01); *H04L 67/02* (2013.01); *H04L 67/10* (2013.01); *H04L 67/22* (2013.01); *H04L 67/42* (2013.01); *H04N 21/443* (2013.01); *H04N 21/454* (2013.01); *H04N 21/4532* (2013.01); *H04N 21/4668* (2013.01); *H04N 21/4756* (2013.01); *H04N 21/4825* (2013.01); *H04N 21/6125* (2013.01); *H04N 21/6175* (2013.01); *H04N 21/8113* (2013.01); *H04H 20/82* (2013.01); *H04H 60/06* (2013.01); *H04H 60/82* (2013.01); *H04L 65/4076* (2013.01); *H04N 21/4622* (2013.01)

(56) References Cited

U.S. PATENT DOCUMENTS

| | | | |
|---|---|---|---|
| 5,734,720 A | 3/1998 | Salaganicoff | |
| 5,931,901 A | 8/1999 | Wolfe et al. | |
| 5,963,916 A | 10/1999 | Kaplan | |
| 6,088,455 A | 7/2000 | Logan et al. | |
| 6,118,450 A | 9/2000 | Proehl et al. | |
| 6,192,340 B1 | 2/2001 | Abecassis | |
| 6,226,672 B1 * | 5/2001 | DeMartin | G09B 7/04 369/30.08 |
| 6,248,946 B1 | 6/2001 | Dwek | |
| 6,314,094 B1 | 11/2001 | Boys | |
| 6,370,513 B1 | 4/2002 | Kolawa | |
| 6,434,621 B1 * | 8/2002 | Pezzillo | H04N 7/17318 348/E7.071 |
| 6,438,579 B1 * | 8/2002 | Hosken | G06F 17/30867 707/999.002 |
| 6,498,955 B1 * | 12/2002 | McCarthy | G05B 13/0265 700/1 |
| 6,546,421 B1 * | 4/2003 | Wynblatt | G06F 17/30867 707/E17.109 |
| 6,581,103 B1 * | 6/2003 | Dengler | H04L 29/06 707/999.001 |
| 6,587,127 B1 * | 7/2003 | Leeke | G06Q 20/123 715/733 |
| 6,662,231 B1 | 12/2003 | Drosset et al. | |
| 7,711,838 B1 * | 5/2010 | Boulter | G06F 17/30761 709/231 |
| 8,700,795 B2 * | 4/2014 | Boulter | G06F 17/30761 709/231 |
| 2008/0285552 A1 | 11/2008 | Abdulla et al. | |
| 2015/0106727 A1 | 4/2015 | Boulter et al. | |

OTHER PUBLICATIONS

Office Action in U.S. Appl. No. 14/578,047, dated Mar. 12, 2015.
Office Action in U.S. Appl. No. 14/577,957, dated Mar. 6, 2015.
Office Action in U.S. Appl. No. 14/578,057, dated Mar. 4, 2015.
Office Action in U.S. Appl. No. 14/578,076, dated Mar. 10, 2015.
Office Action in U.S. Appl. No. 14/578,041, dated Mar. 20, 2015.
Office Action in U.S. Appl. No. 14/577,974, dated Mar. 17, 2015.
Office Action in U.S. Appl. No. 14/195,434, dated Jun. 25, 2015.
Office Action in U.S. Appl. No. 14/578,041, dated Jul. 31, 2015.
Office Action in U.S. Appl. No. 14/578,047, dated Jul. 28, 2015.
Office Action in U.S. Appl. No. 14/578,076, dated Jul. 15, 2015.
Office Action in U.S. Appl. No. 14/578,076, dated Jul. 23, 2015.
Office Action in U.S. Appl. No. 14/577,957, dated Jul. 15, 2015.
Office Action in U.S. Appl. No. 14/578,057, dated Jul. 15, 2015.

* cited by examiner

FIG. 1B

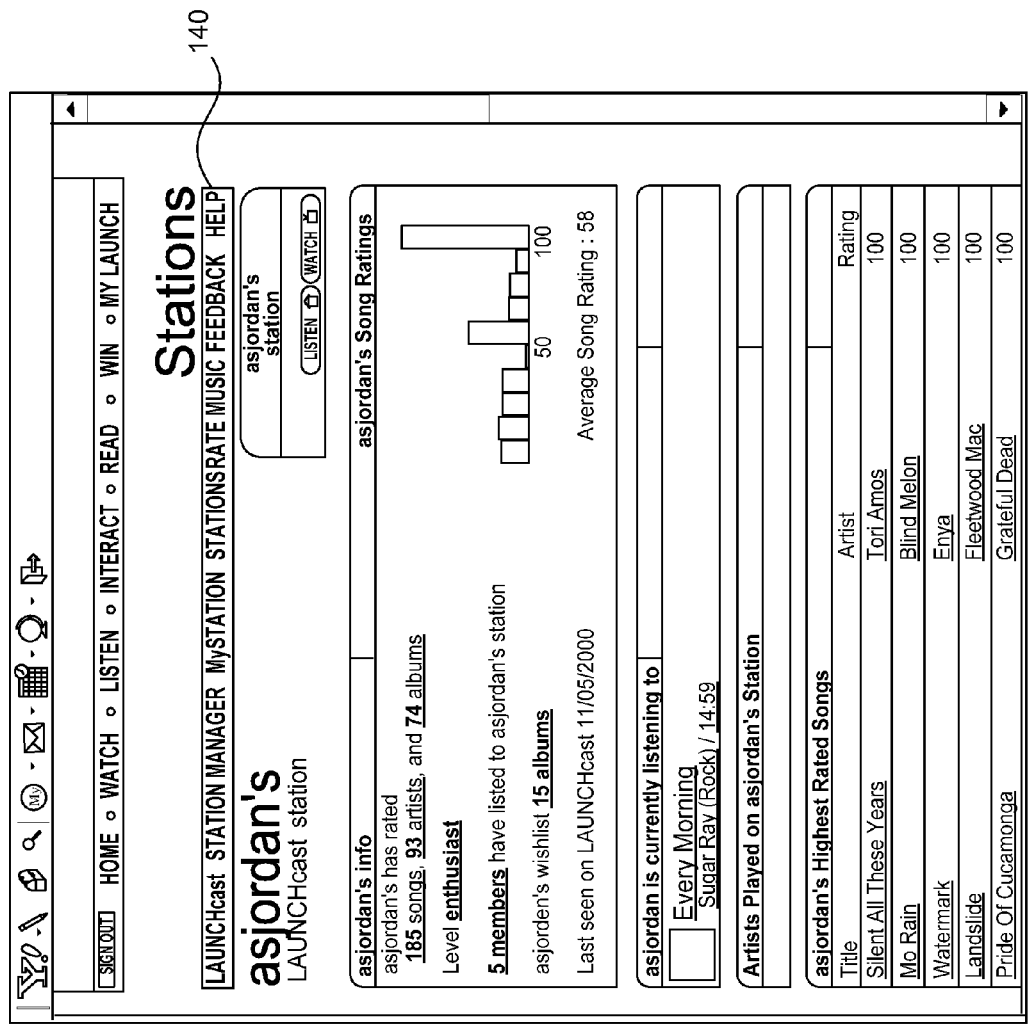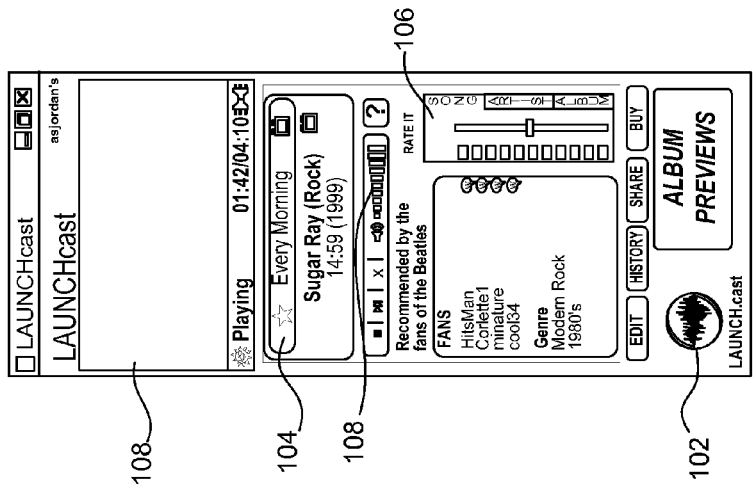
FIG. 1C

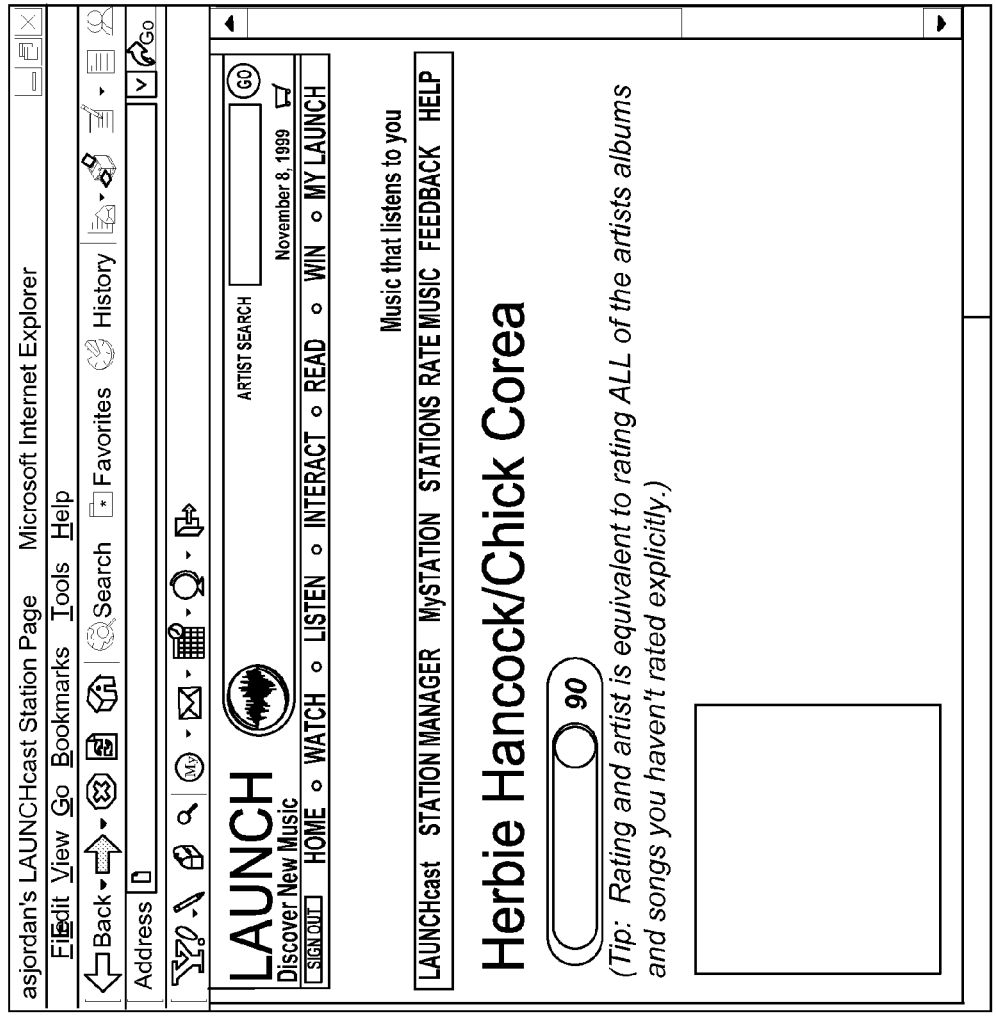
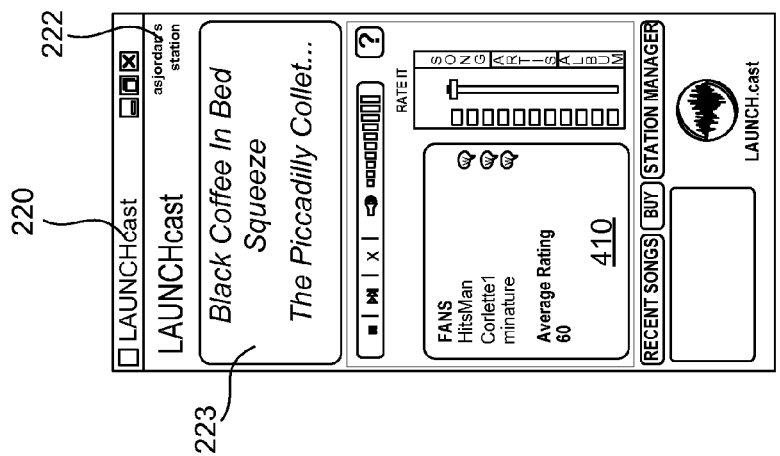
FIG. 4

— 205

LAUNCH — Discover New Music

ARTIST SEARCH [ ] (GO)
November 8, 1999

[SIGN OUT] HOME ○ WATCH ○ LISTEN ○ INTERACT ○ READ ○ WIN ○ MY LAUNCH

"music that listens to you"

| LAUNCHcast | STATION MANAGER | MySTATION | STATIONS | RATE MUSIC | FEEDBACK | HELP | asjordan's STATION
NOW PLAYING
She Has Funny Cars
Jefferson Airplane
2400 Fulton Street
PLAY YOUR STATION LAUNCHcast
☆ She Has Funny Cars
Jefferson Airplane
4:32 / (1967)
■ ▶ x | ◀━━━━ (?)
RATE IT
FANS
HitsMan
Corlette1
miniature
Genre
Modern Rock
1980's
[RECENT SONGS] [BUY] [STATION MANAGER]

Who's Listening
there are 22 members listening

☐ badluckroy ⓦ
  Mama Said Knock You Out / LL Cool J

☐ jnaut ⓦ
  Guilty / Gravity Kills

☐ techno_girl ⓦ
  Cant Back Down / Toad The Wet Sprocket

☐ Msinformation ⓦ
  Creep / Radiohead

☐ richard99 ⓦ
  We Will Rock You / Queen

MORE RESULTS

[Ad]
[Ad]
[Ad]

[PLAY ▷]

STATION MANAGER

| STATION MANAGER | Ratings ≡ |
| | DJs 👥 |
| | Genres ≡ |
| | Stations ≡ |
| | Mood's 👥 |

| LAUNCHcast Top 10 | | November 8 |
|---|---|---|
| RATING | TITLE | ARTIST |
| 1 | Intergalctic | The Beasty Boys |
| 1 | Special | Garbage |
| 3 | Out Of My Head | Fastball |
| 4 | Smells Like Teen Spirit | Nirvana |

FIG. 10

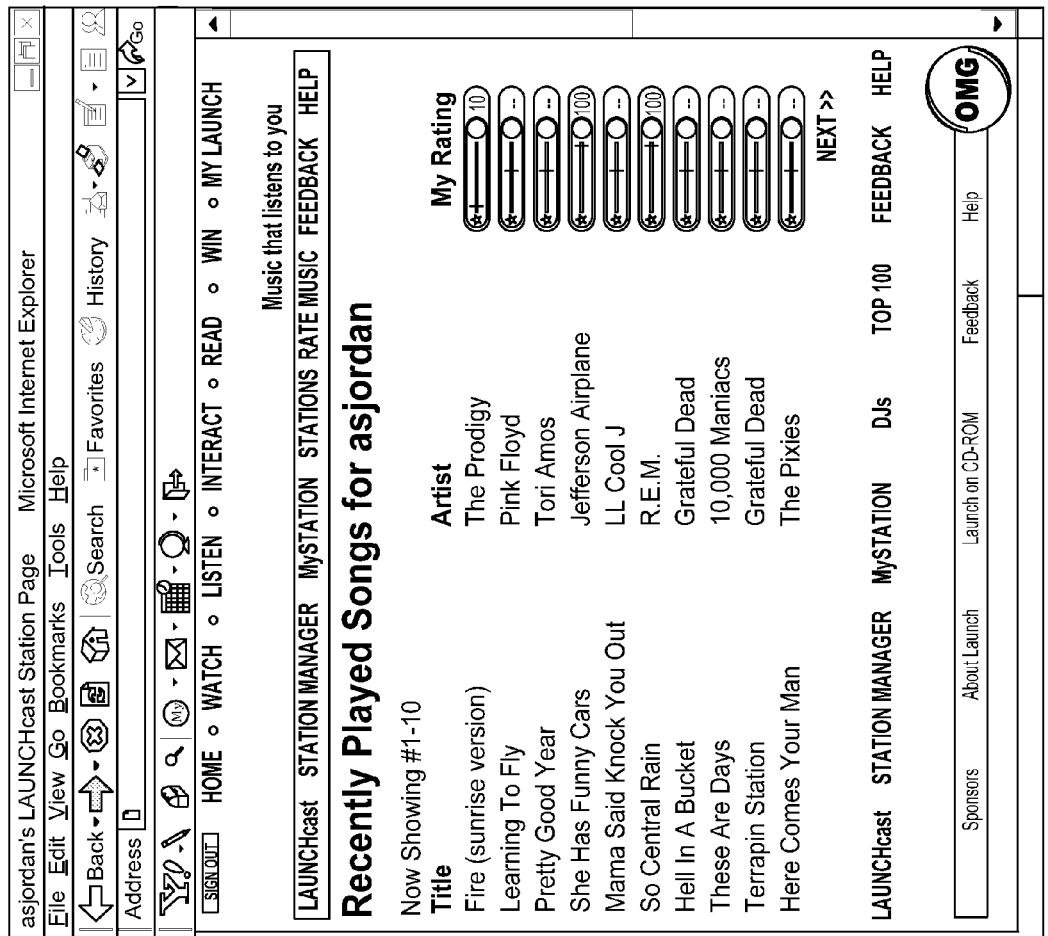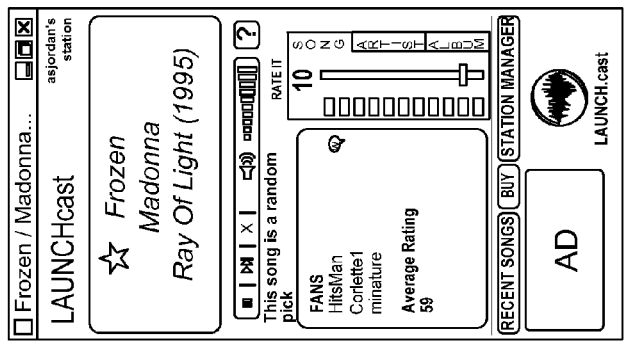
FIG. 12 asjordan's LAUNCHcast Station Page — Microsoft Internet Explorer

File  Edit  View  Go  Bookmarks  Tools  Help

Ray Of Light * (1996)
by Madonna

I OWN IT ☑

BUY IT:
CD $13.00
CASSETTE $7.98

Tracks:
Ray Of Light
Frozen
Mer Girl
Drowned World/Substitute For Love
Swim
Candy Perfume Girl
Skin
Nothing Really Matters
Sky Fits Heaven
Shanti/Ashtangi
Power Of Good Bye, The
To Have And Not To Hold
Little Star

Other albums you might like to purchase

| | | |
|---|---|---|
| Enya | Watermark | I OWN IT ☑ |
| Jefferson Airplane | 2400 Fulton Street The CD ... | I OWN IT ☑ |
| Ottmar Leibert & Luna Negra | Nouveau Flamenco | I OWN IT ☑ |
| Pink Floyd | Wish You Were Here (Gold Disk) | I OWN IT ☑ |
| R.E.M. | Document | I OWN IT ☑ |
| R.E.M. | Reckoning | I OWN IT ☑ |
| R.E.M. | Out Of Time | |

LAUNCHcast    STATION MANAGER    MyStation    DJs    TOP 100    FEEDBACK    HELP

---

□ Frozen / Madonna...    asjordan's station

LAUNCHcast

☆ Frozen
Madonna
Ray Of Light (1995)

■ | ▶ | × |  ◁))    RATE IT  10

☐☐☐☐☐☐☐☐☐☐  SONG
────────────  ARTIST
────────────  ALBUM

This song is a random pick

FANS
HitsMan
Corlette1
miniature

Average Rating
59

RECENT SONGS | BUY | STATION MANAGER

AD

LAUNCH.cast

FIG. 13

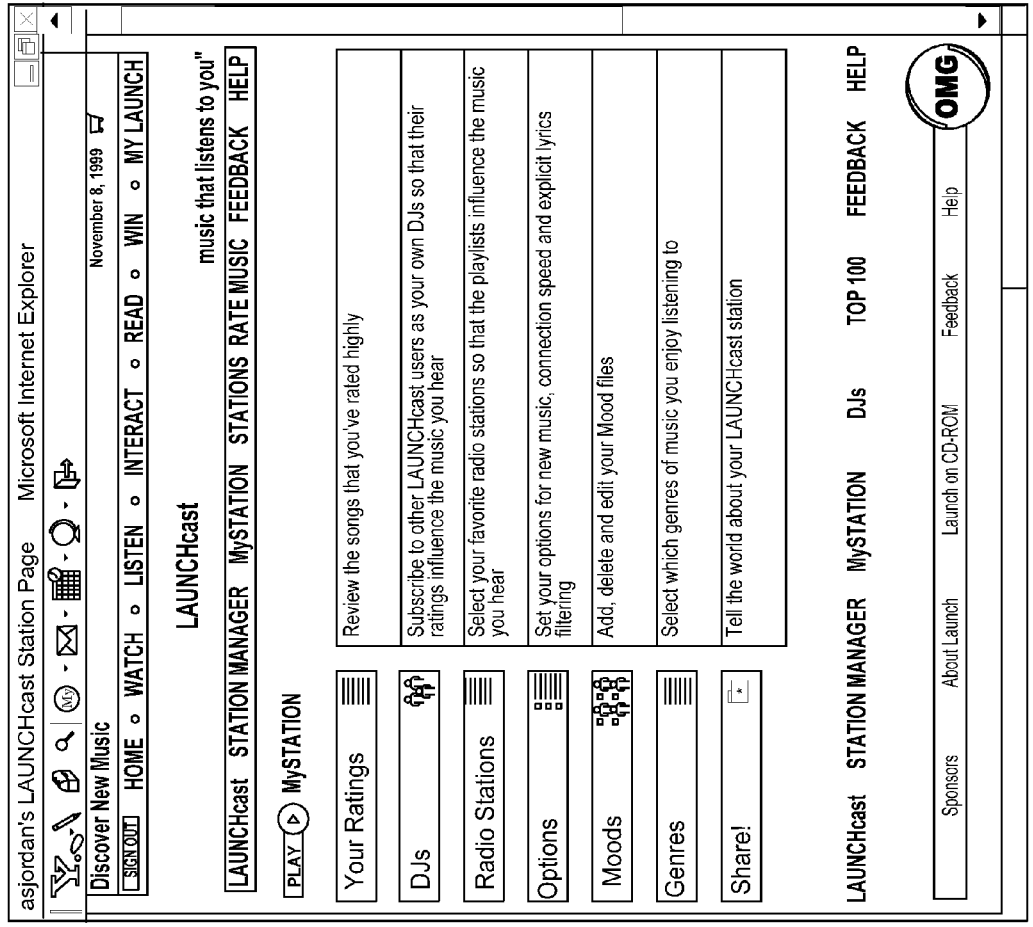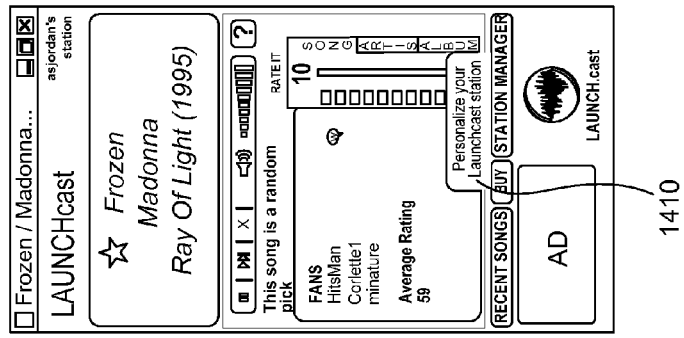
FIG. 14 asjordan's Highest-rated Songs

Now Showing #1-10

| Title | Artist | My Rating |
|---|---|---|
| Watermark | Enya | 100 |
| Wooden Ships | Jefferson Airplane | 100 |
| Today | Jefferson Airplane | 100 |
| Somebody To Love | Jefferson Airplane | 100 |
| She Has Funny Cars | Jefferson Airplane | 100 |
| Embryonic Journey | Jefferson Airplane | 100 |
| Wish You Were Here | Pink Floyd | 100 |
| It's The End Of The World As We Know It (And I Feel Fine) | R.E.M. | 100 |
| So Central Rain (I'm Sorry) | R.E.M. | 100 |
| Losing My Religion | R.E.M. | 100 |

NEXT >>

| CONNECTION TYPE | AUDIO QUALITY |
|---|---|
| ○ Office or School LAN, Cable modem, DSL, ISDN | 64 kb/s Stereo |
| ○ 56K modem | 32 kb/s Stereo |
| ⊙ 28.8 or 33.6 modem | 16 kb/s Mono |

How much new music would you like to discover?

○ I want to discover a lot of music
○
○
⊙ I want a mix of music I've rated highly and music I haven't rated
○
○
○ I want to listen to mostly music I've rated

Do you want to hear music with explicit lyrics?

☐ Yes, play music that contains explicit lyrics

Save

LAUNCHcast  STATION MANAGER  MySTATION  DJs  TOP 100  FEEDBACK  HELP

Sponsors  About Launch  Launch on CD-ROM  Feedback  Help  OMG

*FIG. 21*

| LAUNCH Discover New Music | Microsoft Internet Explorer | | |
|---|---|---|---|

File  Edit  View  Go          Tools  Help asjordan is currently listening to
Doll Parts - (acoustic version)
Hole *Ask For It (EP)* asjordan's Highest Rated Songs

| Title | Artist | Rating |
|---|---|---|
| Watermark | Enya | 100 |
| Wooden Ships | Jefferson Airplane | 100 |
| Today | Jefferson Airplane | 100 |
| Somebody To Love | Jefferson Airplane | 100 |
| She Has Funny Cars | Jefferson Airplane | 100 |
| Embryonic Journey | Jefferson Airplane | 100 |
| Wish You Were Here | Pink Floyd | 100 |
| It's The End Of The World As We Know It (And I Feel Fine) | R.E.M. | 100 |
| So Central Rain (I'm Sorry) | R.E.M. | 100 |
| Losing My Religion | R.E.M. | 100 |

| asjordan's DJs (None)  (edit) | asjordan's Subscribers (None) Total: 0 | asjordan's Radio-Stations (None)  (edit) |
|---|---|---|

DJ SEARCH

Find a DJ named [        ] [Go]

LAUNCHcast  STATION MANAGER  MySTATION  DJs  TOP 100  FEEDBACK  HELP

Sponsors    About Launch    Launch on CD-ROM    Feedback    Help    OMG

*FIG. 27*

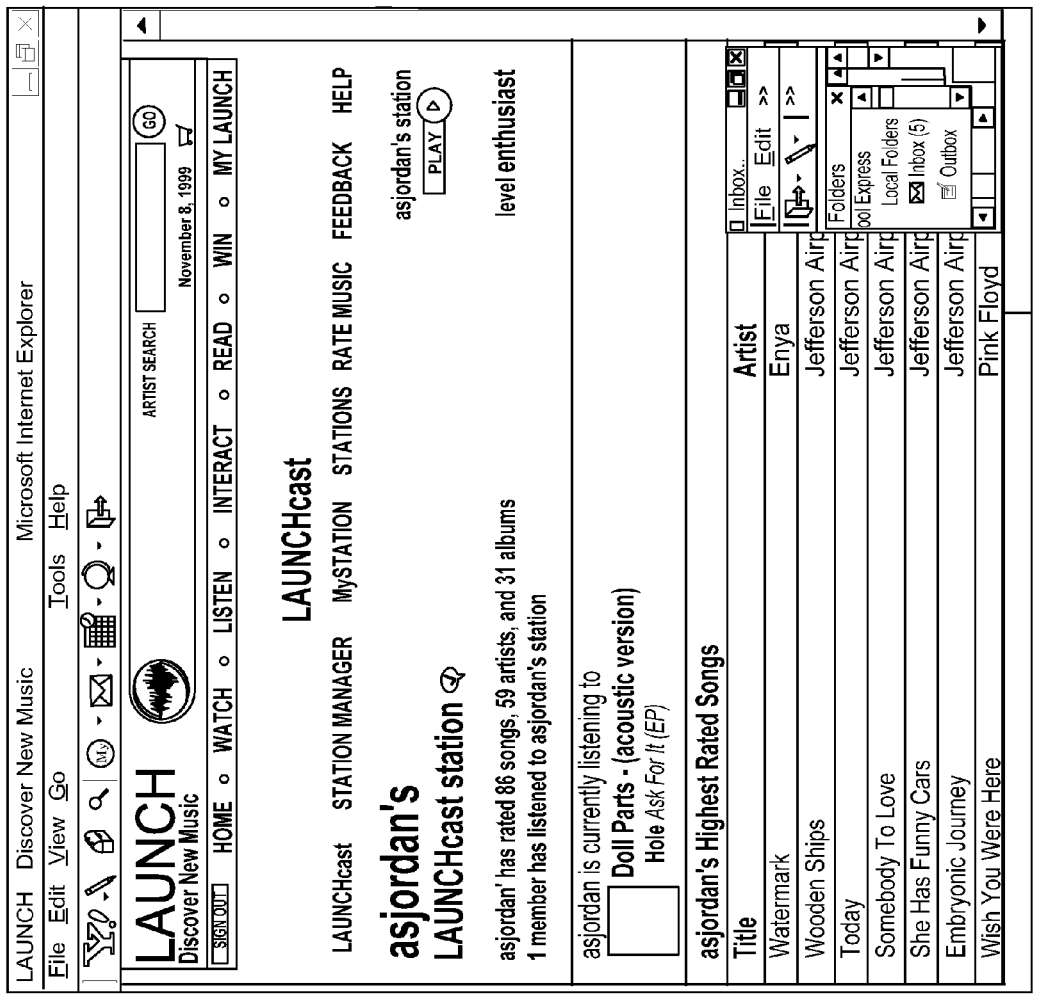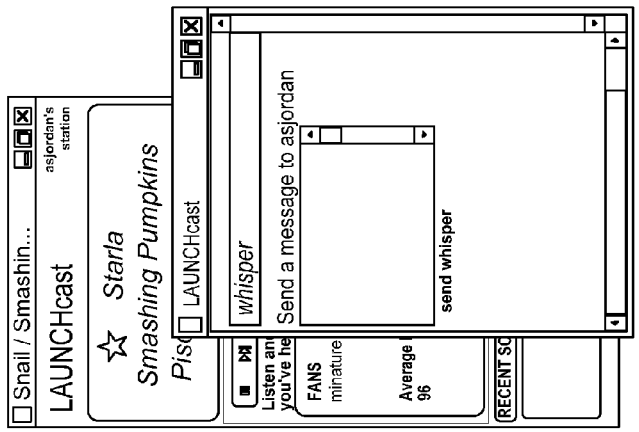
FIG. 28

| Audio                                     | Video* window expansion                                                                             |
| (contains basic player functionality)     | (displays video when in video mode)                                                                 |
|                                           |                                                                                                     |
|                                           | "When video is off in a community channel. chat takes up entire right pane"                         |
| Users window                              | Chat window expansion (v2.5)                                                                        |
| (who's listening to this)                 | (type and view chat)                                                                                |
| STATUS: Personalizing your LAUNCHcast     ||

*FIG. 32*

| Old Rating | Old Rating Text | New Rating |
|---|---|---|
| 7 | The Best! | 90 |
| 6 | Great | 75 |
| 5 | I like that | 60 |
| 4 | It's OK | 40 |
| 3 | Not my thing | 30 |
| 2 | Pretty Bad | 20 |
| 1 | Hate It | 0 |

*FIG. 33*

| Weight Matrix | Album Exists | Artist Exists | Neither Exists |
|---|---|---|---|
| Album->song rating | .30 | 0 | 0 |
| Artist->song rating | 0 | .20 | 0 |
| MyDJs avg rating | .15 | .15 | .20 |
| BDS Playlist->song rating | .15 | .15 | .20 |
| Venue->artist->song rating | .05 | .05 | .05 |
| NetP recommendation rating | .05 | .05 | .10 |
| Community average rating | .05 | .05 | .05 |
| Last Played | .25 | .25 | .20 |
| Total | 1.0 | .09 | .08 |

FIG. 34

| Song | Album->Song | Artist->Song | MyDJs Avg | BDS Playlist | Venue | NetP | Community Avg | Last Played |
|---|---|---|---|---|---|---|---|---|
| Dizz Knee Land | 0 | 0 | 68.4 | 0 | 0 | 56.9 | 61.2 | 56.2 |
| Building A Mystery | 75 | 0 | (55.1) | 0 | 100 | 65.1 | 55.1 | 23.1 |

| Army | 0 | 65 | 78.9 | 60 | 100 | 47.3 | 52.8 | 100.0 |

FIG. 35

Weight matrix:

| Song | Album->Song | Artist->Song | MyDJs Avg | BDS Playlist | Venue | NetP | Community Avg | Last Played |
|---|---|---|---|---|---|---|---|---|
| Dizz Knee Land | 0 | 0 | 0.20 | 0.20 | 0.05 | 0.05 | 0.05 | 0.20 |
| Building A Mystery | 0.3 | 0 | 0.15 | 0.15 | 0.05 | 0.05 | 0.05 | 0.25 |
| Army | 0 | 0.2 | 0.15 | 0.15 | 0.05 | 0.05 | 0.05 | 0.25 |

FIG. 36

Score matrix:

| Song | Album->Song | Artist->Song | MyDJs Avg | BDS Playlist | Venue | NetP | Community Avg | Last Played |
|---|---|---|---|---|---|---|---|---|
| Dizz Knee Land | 0 | 0 | 13.68 | 0 | 0 | 2.85 | 3.06 | 11.24 |
| Building A Mystery | 22.5 | 0 | 8.63 | 0 | 5 | 3.26 | 2.76 | 5.78 |
| Army | 0 | 13.0 | 11.84 | 9 | 5 | 2.37 | 2.64 | 25.0 |

FIG. 37

INTERNET RADIO AND BROADCAST METHOD PERSONALIZED BY DJ

CROSS-REFERENCES TO RELATED APPLICATIONS

This application is a Continuation of prior, U.S. application Ser. No. 14/195,434, filed on Mar. 3, 2014, which is a continuation of U.S. patent application Ser. No. 12/765,525, now U.S. Pat. No. 8,700,795, filed Apr. 22, 2010, which is a Continuation of U.S. patent application Ser. No. 09/709,234, filed Nov. 9, 2000, now U.S. Pat. No. 7,711,838, which claims the benefit of U.S. Provisional Patent Application No. 60/164,846 filed Nov. 10, 1999, the contents of each of which are incorporated herein by reference.

BACKGROUND OF THE INVENTION

1. Field of the Invention

This invention relates to Internet media data streams and the like, and more particularly to a copyright-compliant audio/video/radio broadcast system over the Internet where each individual user is able to set his or her preferences regarding works played so as to influence the frequency such works are broadcast to the user.

2. Description of the Related Art

The rise of the Internet has provided many different channels through which media can be presented to users. RealNetworks' RealMedia, Apple QuickTime, and Windows Media all provide players through which live or previously-recorded data streams can be displayed, played back, or broadcast to the individual user. Both audio and video are generally available through these programs and provide a higher and more attractive degree of interactivity with the Internet.

Regular radio broadcasts are based upon a central individual or station broadcasting songs, or other audio information, electromagnetically. Different radio stations are separated by their different carrier frequencies. Amplitude modulation (AM) and frequency modulation (FM) provide two means by which radio broadcast can be effected by a transmitter to a receiver. If an individual wants to affect the songs that are played by the radio station, he or she may write, call, fax, e-mail, or otherwise transmit their preferences to the radio station.

However, one person's preferred music may not be as appreciated by another individual. Music can be very personal, often affecting a person at an emotional level. When the radio station broadcasts a song or other audio signal, all receivers tuned to the carrier frequency pick up the broadcast and either enjoy or suffer the broadcast equally.

It would be much more advantageous to allow each individual to influence their own set of song playlists. Currently, this is not achievable by wireless broadcast means. However, unique data stream addressing available through Internet data processing might provide means by which an Internet radio could be advantageously affected. Other Internet broadcasting processes are known, but generally follow the known radio station format of broadcasting a single song, or data stream, to all users tuned to the station or channel. In compliance with the Digital Millennium Copyright Act (DMCA), such a radio would have to comply with statutory regulations regarding the broadcast of songs and would generally have to avoid the role of an "on-demand" system, as this might be in violation of statutory regulation.

SUMMARY OF THE INVENTION

The present invention provides a copyright-compliant, broad-based, individually-tailored Internet media broadcast system and method. The present invention provides means by which users may individually rate or indicate music, music videos, or other recorded media that they enjoy hearing from a vast musical or other database. Additionally, such users may also indicate the exclusion of music/media that is to their distaste. In so doing, the user interaction is limited to that decision-making role that is necessary for the user to establish his or her preferences. The Internet radio of the present invention and its method take care of the rest, providing the end user a media or radio channel tailored to his or her own musical tastes. In this way, the present invention can be said to "microcast" or "narrowcast" the content of personalized songlists to individual listening stations or users. As the broadcast uses Internet protocol, each data packet of each data stream has its own individual address, namely, the end-user's data stream player. As the present invention is scalable, thousands, even tens or hundreds of thousands of listeners can be handled by the present invention. With the advance of data-transmission technology, tens or hundreds of millions of users may be served by, or given access to, a system incorporating the present invention, including the delivery of user-preferred data streams by wireless communication links.

Mention is made herein of the present invention with respect to music broadcast to provide a personalized Internet, or data stream, radio. Note should be taken that use of the term "radio" "music," and the like includes any recorded datastream content, including music videos and the like.

At the core of the present invention is the playlist generator. It is the generated songlist that is associated with the user's account and indicates to the system which song is to be played next. Once a song has been selected, it is then streamed as data out to the individual's computer (uniquely identified by Internet protocol). As the central server of the system can handle a large number of users at any one time, it becomes possible to serve each user with his or her own individual data stream. In this case, the data stream comprises audio and/or video information and serves to establish a situation similar to each user having his or her own individual radio station that he or she programs. The list can be created in advance and stored, or generated, in real time when needed. Collaborative filtering techniques may be used in constructing the playlist.

Other applications for the present method may also exist when similar circumstances are present where a large database of information is available that is subject to individual preferences. In a broad sense, the present invention provides means by which individual subsets of an all-encompassing data space may be defined, modified, and preserved, subject to a variety of influences and allowing some serendipitous, or random, events to occur.

OBJECTS OF THE INVENTION

It is an object of the present invention to provide individualized data stream programming according to an individual's preference.

It is yet another object of the present invention to provide an Internet-based radio or music playing system that is biased according to each user's preferences.

It is yet another object of the present invention to provide a means by which song playlists may be generated for such an Internet radio.

It is an object of the present invention to provide copyright-compliant media streams for Internet and other networked systems broadcast These and other objects and advantages of the present invention will be apparent from a review of the following specification and accompanying drawings.

BRIEF DESCRIPTION OF THE DRAWINGS

FIG. 1B is a screen shot showing a computer desktop with the audio player and user homepage in accordance with an embodiment of the present invention.

FIG. 1C is a screen shot showing a computer desktop with the video player and user homepage in accordance with an embodiment of the present invention.

FIG. 4 shows the smaller player window and the larger data window used in an embodiment of the present invention.

FIG. 10 is a close up view of the initial LAUNCHcast window of FIG. 2.

FIG. 12 shows the player window with its "RECENT SONGS" tool tip, as well as the data window displayed in response to selecting the recent song's hyperlink in accordance with an embodiment of the present invention.

FIG. 13 shows a Windows 98 desktop with the smaller player and larger data windows. The "BUY" tool tip is displayed, as well as the data window corresponding to the BUY hyperlink in accordance with an embodiment of the present invention.

FIG. 14 shows the desktop of the player and data windows with the player window showing the "STATION MANAGER" tool tip, as well as the data window corresponding to the STATION MANAGER hyperlink in the player window in accordance with an embodiment of the present invention.

FIG. 15 is the data window show for selecting the "YOUR RATINGS" hyperlink in FIG. 14 in accordance with an embodiment of the present invention.

FIGS. 16 and 17 show the data window display when selecting the "DJs" hyperlink of FIG. 14 in accordance with an embodiment of the present invention.

FIGS. 20 and 21 show the data windows displayed when the "Options" hyperlink is selected in FIG. 14 in accordance with an embodiment of the present invention.

FIGS. 26 and 27 show the data window displayed when the "MySTATION" link is selected as show at the top of FIG. 26 in accordance with an embodiment of the present invention.

FIGS. 28-30 show the present invention window displays as background to a "whisper" or instant messaging, function enabling users to send messages to one another across the LAUNCHcast system in accordance with an embodiment of the present invention.

FIG. 32 shows an expandable window for video display and chat in accordance with an embodiment of the present invention.

FIG. 33 shows additional examples of a song ratings scheme in accordance with an embodiment of the present invention.

FIG. 34 shows an example of a weight matrix in accordance with an embodiment of the present invention.

FIG. 35 shows an example of a user profile matrix in accordance with an embodiment of the present invention.

FIG. 36 shows a weight matrix in accordance with an embodiment of the present invention.

FIG. 37 shows a score matrix in accordance with an embodiment of the present invention.

BRIEF DESCRIPTION OF THE APPENDICES

The following appendices are incorporated herein by this reference thereto from U.S. Pat. No. 7,711,838.

Appendix 1 is an excerpted text listing of a playlist generated in conformance with the present invention.

Appendix 2 is a source code listing for one embodiment of the present invention.

Description of the Preferred Embodiment(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

As mentioned above, use of the term "radio," "music," and the like includes any recorded datastream content, including music, videos, recorded sports events and concerts, and the like.

Figure 1A:
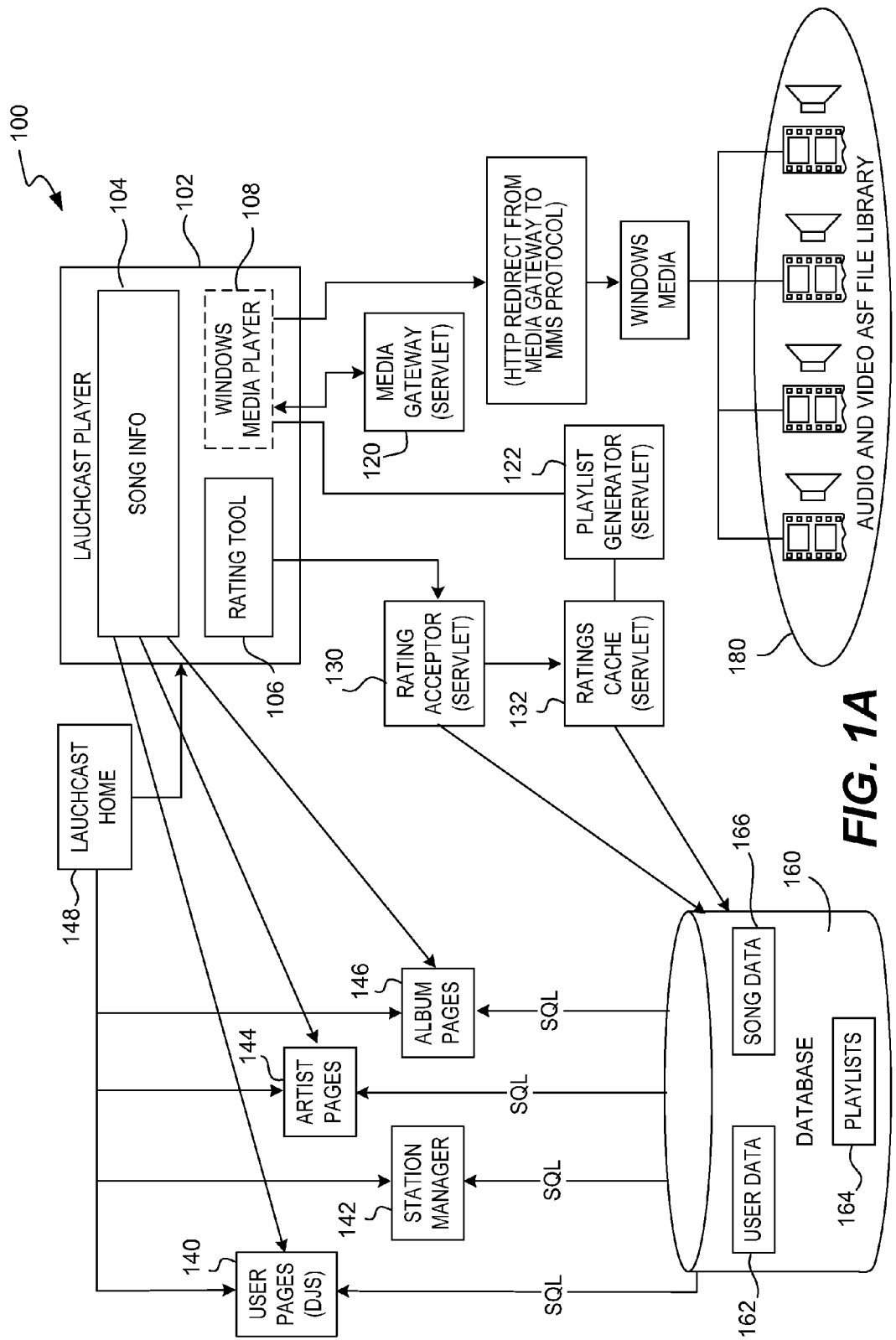
FIG. 1A is a schematic view of the system architecture used to achieve one embodiment of the present invention.

In FIG. 1A, the general structure of the present system is shown where the LAUNCHcast Player provides user feedback and indication of song preference through Java Servlets and JavaScript code. In one embodiment, a Windows Media Player may provide the interface allowing the audio and/or video broadcast to take place at the user's computer. Other media players now known or developed in the future may also suffice and operate to good advantage. Mentioned use of the Windows Media Player system is to be considered as indicating any appropriately functioning media player. Song or video information is available through both the player and the accompanying data window.

Referring now to FIG. 1A, the architecture and system structure of the Internet radio and broadcast method of the present invention is shown in schematic form. The system 100 is generally focused upon the player 102. The player 102 is the component that the user sees and is ultimately the arbiter of the media datastream service provided by the present invention. As shown in FIG. 1, the player 102 has a song information section 104, a rating tool 106, and a player 108. For this last component, the player 108 is indicated as being a Windows Media Player. However, other media players can also be used to good advantage in order to achieve the present invention.

Through its components, the player 102 is linked or associated to a number of other sources of information and programs, including Java or other servlets. The present invention, when implemented in software, may be so implemented using Java-family of computer program languages. A servlet is Java programming that runs as a part of a network service, such as an HTTP server, in response to requests from clients. In this case, the client can be considered to be the player 102 while the HTTP server can be the servers for the database 160 and the media content library 180.

At a center of the present invention is the player 108. The player 108 allows the content to be broadcast to the individual user and serves as means by which the user can enjoy such content. In addition to being linked to the media database 180, the player 108 is also in communication with a media gateway servlet 120 and a playlist generator servlet 122. As discussed in more detail below, these two servlets provide the player the ability to play streaming media in conformance with the present invention.

The rating tool 106 is coupled to the database 160 via a rating accepter servlet 130 and a ratings cache servlet 132. As indicated in FIG. 1, the rating accepter servlet 130 and ratings cache servlet 132 are also in communication with one another, as set forth in more detail below.

The song information component 104 of the player 102 may provide links to other information available through the database 160 or otherwise. For example, the song information tool 104 may provide links to other user pages 140, a station manager 142, provided home pages of various artists 144, as well as links to album pages 146 of such artists or otherwise. Additionally, a central homepage 148 may be present that allows travel or linking to any or all of available pages or services.

Note should be taken that the database 160 is not necessarily the home for the media library 180. In fact, according to present technology, it may be more advantageous to provide some means by which high-speed access can be provided to the media library 180. By separating the database 160 from the media library 180 faster and better service may be provided to users so they may enjoy the content of datastream better. Certain infrastructures may allow for offsite residence of the media contained in the media library 180. Pointers or other indicators to such information in an indexed or other form can thereby provide the link necessary to deliver the preferred or indicated content by the user from the media library 180 to that same user.

As shown in FIG. 1A, the database 160 may hold a variety of types of information, including: user data 162, playlists 164, and song data 166. Such information is stored by the database 160 and updated by the servlets as set forth in the present invention, including the user code set forth in Appendix 2.

Figure 1B:
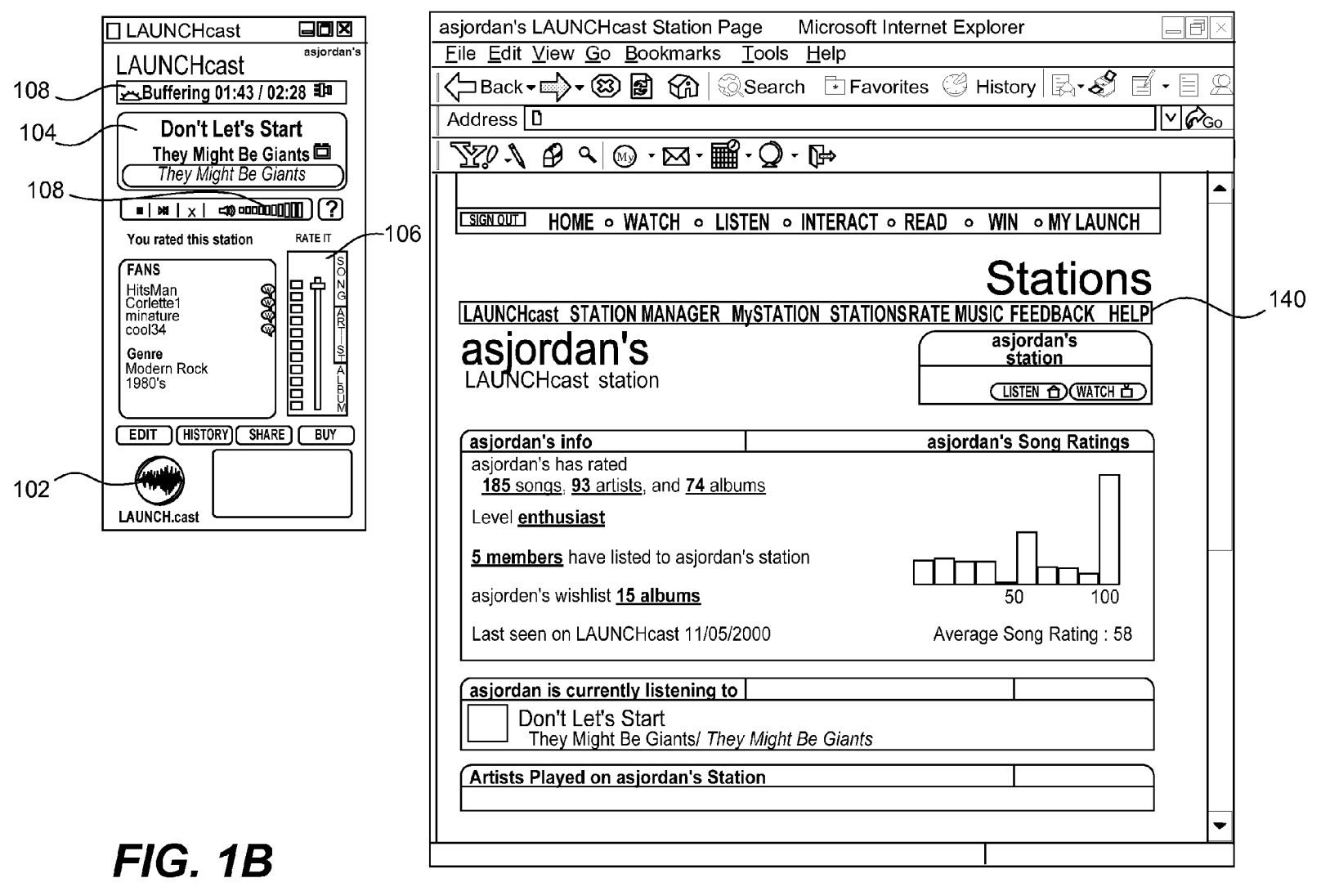

In FIG. 1B, the player, or playback, window 102 is shown and is highly interactive with several embedded hyperlinks. In the upper right-hand corner of the playback window 102, the indication of "asjordan" is made. By clicking on this link, more information about the current station may be given and/or the ability to change such station. The user's page 140 may be activated and shown upon clicking the username link. In the right center of the playback window, a "RATE IT" window indicator that is the rating tool 106 is given, allowing the individual to rate the current "SONG," the "ARTIST" performing the current song, and/or an "ALBUM" containing the song. Below the "RATE IT" indicator, hyperlinks to "RECENT SONGS," "BUY," and "STATION MANAGER" are present allowing the user to travel to those destinations and either learn more information, purchase or review purchasing information about the current album being played, as well as access the station manager for the present invention.

Below the song information window 104, icons arc given for Play/Pause. Skip This Song. Skip This Song and Never Play It Again ("Delete"), and a Volume control. The question mark ("?") shown below the "Song Information area" window is a hyperlink to a Help file for the playback window 102 and the Internet Radio system of the present invention. These icons are also shown in the other playback window FIGS., such as that for the video playback user interface/client 102 shown in FIG. 1C.

FIGS. 1B and 1C show a desktop display of the system 100 in action from the user's point of view. A tool lip may be given when the cursor hovers over the song title. The same may be similarly true for the artist and the album currently playing. Note should be taken that just as the song rating indicator is highlighted and active in the middle right section of the playback window, the song title is highlighted in the upper portion of the playback window.

Additionally, the left and center middle portion of the playback window provides information regarding fans who have strong positive feelings about the present song, artist, and/or album, as well as an average rating for all users or some subset of users on the system.

FIGS. 1B and 1C show small balloons on the right-hand side of the central dark area across from the "Fans." These balloons may have a letter "W" inside of them to indicate another listener is currently online and can be engaged via the instant messaging ("whisper") function. FIGS. 1B and 1C also show graphic information that may be used for advertising or other hyperlinks. In generating the playlist of the present invention, the user can be informed as to why a particular song was picked.

For other links and presentation of information in the player 102, a tool tip may be presented when the cursor hovers over an area. A tool tip is a small window providing succinct information about the item under the cursor when the cursor hovers over that item.

When the system 100 is updating and obtaining a new data stream from the system for the user, a display may be given to the user to indicate ongoing activity of the playback system. Such visual activity in the form of animation assures the listener/viewer that the short span of silence, or "dead air," following a song is only temporary and that a new song will soon play. Generally, in order to promote interactivity and to take advantage of the new media that the Internet provides, the windows shown in the FIGS. 2 and 3 contain ample internal hyperlinks that lead to web pages providing information regarding music, artists 144, and/or their works 146, web pages regarding other users of the system (as DJs or otherwise) 140, and/or web pages regarding the user's control of the system (preferences, etc.) 142.

The default paradigm for the user interface/player 102 is to allow the user the greatest degree of freedom in expressing preferences and in obtaining that preference information regarding music artists, and their publications/albums. In this way, the user's experience is enhanced as he or she hears more of the music he or she likes. Access to purchasing web sites is also made available where users may purchase artists' works.

In implementing the present invention in software, the accompanying source code (Appendix 2) may be used to achieve the present invention. Such code is subject to copyright protection and is owned by LAUNCH Media, Inc. of Santa Monica. Calif.

The generation of a proper playlist combining available user ratings and a media database forms an important part of the present invention. One such playlist as generated by the present invention is shown in Appendix 1 and is an excerpted form for purposes of explanation. Entries in the playlist have been removed so that the playlist may better serve the explanatory purposes herein without undue length or the sacrifice of sufficient detail.

Playlist generation occurs when a user launches his client player 102. A Windows Media or other player 108 is embedded in the user's client player 102. The player 108 opens a call to the playlist generator servlet 122 as executed by the PlaylistGeneratorServlet routine (Appendix 2. page 158). The expected output from this HTTP call is an ASX playlist file, which in the present invention is list of pointers to a script that reads the actual playlist data object from the database 160.

The playlist generator servlet 122 parses the particular parameters for this ASX playlist as follows:

Object: GeneratorParameters; [0048] userID: (required) the user for whom the playlist is generated;

djID: (default is userID) the user whose profile will be used to generate the playlist;

moodID: (default is none) a mood which is a subset of a profile may be indicated and used to alter the preferences in the playlist and under which to listen (optional); and [0051] bandwidth: (default is 28.8 k, if not read from the user's preferences in the database) the bit rate at which the user wishes to listen.

The database 160 with the playlist database 164 is checked for an existing playlist by PlaylistStatus (Appendix 2, page 192). If a playlist already exists, it can be used it if all the following are met (and PlaylistStatus.isState( ) returns false):

all of the parameters (userID, djID, etc) match; there arc more than 8 songs left;

the newRatingsCount (counter of new personalization data since last refresh) is less than 15; and the playlist is less than a week old.

If all these conditions are met, the dates for the last time the user listened to an ad, news bit, and tip may be reset and the playlist may be resaved. The ASX file is written out and media player begins to execute by making requests to the media gateway 120 to play music.

If the old playlist cannot be used, a new one is created with the playlist generator via PlaylistGenerator.create( ).

The first step is to retrieve the user's preferences via PlaylistGenerator.getOptions( ). In response the following options are returned:

unratedQuota: how much new (not rated) music they want hear in their playlist. The options here are 90, 80, 70, 50, 40, 30, and 20 percent. The default is 50 percent.

explicit lyrics: Does this user want us to play music with explicit lyrics? True or false.

bandwidth: if the bandwidth is not already specified in the generator parameters, it is read from stored data. Currently, bandwidth options include 28.8, 56, and T1/LAN. The default is 28.8 if a valid setting of "none" is found in the database.

A list of all the possible songs available for play (via PlaylistGenerator.gatherMedia(( ) as well as some other data about those songs is obtained. This is generally done using multiple threads running at the same time for better performance. The list of songs is held in hashtable (as via the Population subroutine (Appendix 2, page 198)).

The database 160 is first called to load a history of all the songs played for the user in the last 30 days. This is stored in the database as a long string, formatted as: "Date>=<songID>, <Date>=<songID> . . . " For performance reasons, reading one siring from the database is faster than reading potentially several thousand rows individually from the database. Dates older than 30 days are ignored and the last lime a song was played overwrites previous plays of a song. Each time a song is played via the media gateway 120, this siring is appended.

After the history loading is complete, a random integer is picked from 1 to 10. If the value is 1, the date and songID siring is recreated and rewritten to the database. This cleans up the string by removal of songs that were played more than 30 days ago as well as duplicate entries for the same songID.

The history loads as a thread, and another database call is made to get the user's, or DJ's, list of subscribed DJs, genres, and radio stations (via PlaylistGenerator.getSubscriptions(( ) for the specific mood requested. The result of this call is three lists called DJs, genres, and stations.

Once the subscriptions are available, the ratings are obtained via GetRatings. This is also done in a thread. The song hashtable, another hashtable that contains Artist and Album ratings (ItemsProfile), the DJ, and the list of subscribed DJs are all passed to the GetRatings method routine.

A retrieval list of users whose ratings are to be retrieved is compiled using the subscribed DJs and the DJ requesting the playlist. A request is made to the ratings cache to retrieve all these ratings via RatingsCache.getRatings( ).

When the playlist generator has all the ratings, it is ready to assemble them into categorized data structures, based on the properties of each rating. It iterates through all the ratings and stores them in the following manner. If the ID of the user is the DJ and the rating is 0 (an 'X' in the end-user interface), the song is added to song hashtable (via Population) as an "Excluded" type, meaning that song should never be played. The rating is also added to the average rating for songs by that artist. If the rating is not 0, the song information cache is immediately checked via SongInfoCache.gel( ) for data about this song. If the data does not exist in the cache, it is a song that was rated, but is not available for play (as possibly not encoded), and the song is immediately marked as an "Excluded" song.

If all of the above tests pass, the song is added to the song hashtable with a type of "Explicit". The rating for the song is included in the calculation of this DJ's average rating of songs by the artist.

Each song that is rated by subscribed DJs is added to the song hashtable. The subscribed DJ's rating for the song is included in the calculation of the subscribed DJs' average rating for this song.

For albums, the ratings profile is obtained from the item rating profiles. If a ratings profile for an album does not yet exist, then the data regarding the album is retrieved and a ratings profile is created.

If the rater is the user requesting the playlist, the rating for this item is set to the user's rating. However, if the rater is a subscribed DJ, the rating is added to the DJ's average for this album.

For artists, the rating procedure is the same as for albums, except any ratings made for the artists listed as "Various Artists", "Soundtrack", or "Original Soundtrack" are discarded or ignored in the relevant calculations.

The top 1000 most popular songs (via PlaylistGenerator.getPopular( )) in the bandwidth type specified may be added to the song candidate hashtable. This popular list is maintained in the song information cache. Before each song is added to the song hashtable, inspection is made see if the song is already in the candidate hashtable (perhaps put there by another query). If so, inspection is made to make sure that the song is not of type "Excluded", or the song is discarded. If the song is added to the song hashtable, it is added under the type "Unrated".

A maximum of 5000 songs are picked randomly (via PlaylistGenerator.getRandom( )). Initially, a count is made of the number of songs contained in each and all of the genres a user has selected (via SongInfoCache.countInGenres( )). Songs may be in multiple genres. The number of songs is then divided by the total number of songs in the song information cache. If the result is less than 5%, songs are picked directly from a list of songs only in those genres. Otherwise, songs can be picked randomly from all available songs. This calculation may be performed to avoid the situation where a user has selected a small number of genres and picking songs randomly will return only a few songs that are available or allowable for play when considering their genres.

In order to select songs only from selected genres, a determination is made of the total number of songs to pick (via totalToPick) from the lesser of 5000 and the total number of songs in the selected genres, for each genre, a copy of the list of songs in that genre is obtained from the song information cache (via SongInfoCache.getInGenre( )). The number of songs to pick from each genre is determined from the following formula: songs to pick=totalToPick*(number of songs in this genre/total number of songs in the selected genres).

The determined number of songs is picked and attempts are made to add the songs to the song hashtable with a type of "Unrated." A song is not added if it is already in the hashtable.

In order to select from all songs, a song is randomly selected 5000 times. Each time, attempts are made to add the song if it is not already there as picked, as described above. Once the process finishes adding random songs, all the ratings for the songs are retrieved as are all the dates of when the songs were played for the user. The explicit, implicit, and unrated lists built in the last step are taken and ordered in descending order by score, or rating, using a quicksort or other algorithm.

The number of songs to pick from each list is determined. For example, if the size of a playlist is 50 songs, the following may occur. If the user is listening to his own station, the following formula may be used: if the user's list of explicit and implicit songs is smaller than 100 songs, 90% of the songs must be picked from the unrated list to avoid playing the user's rated songs too much. The user's unrated quota may, then, be set to 90. Otherwise, an unrated quota may be used from the user's stored options.

Under some circumstances the maximum number of songs available from the explicit and implicit song lists is calculated as follows:

maximumRated=playlistSize*(100−unratedQuota)*0.01.

The maximum number of songs available from the explicit list may be calculated as:

MaximumExplicit=number of songs in the explicit list*0.20.

A number of songs to pick from the explicitly-rated list may then be:

explicitToPick=playlistSize*(100−unrated quota)*0.01*(number of songs in the explicit list/sum of explicit and implicit songs)*3);

From this the number of implicit songs is simply:

implicitToPick=maximumRated=explicitToPick.

Confirmation can be made to ensure that more explicit songs have not been picked than indicated by maximumExplicit and that no more implicit songs have been picked than those that are in the implicit list. The number of unrated songs is then: playlistSize−(explicitToPick−implicitToPick)

If the user is listening to a station other than his own and the number of songs in the explicit and implicit list total greater than 200, then the following calculations are made:

explicitToPick=Minimum(playlistSize*0.50,20% of explicit songs): and implicitToPick=Minimum(playlistSize. #of implicit songs)−explicitToPick If, for some reason, a sufficient and/or playlistSize number of songs is not obtained from this calculation, a third of the songs is picked from each of explicit, implicit and unrated songs with a check to ensure that not more than 20% of the songs on the rated and unrated lists are picked. As a fallback measure if none of the methods above used to calculate the number of songs to pick worked, the songs are selected as a third of the playlistSize from each list, making sure not to pick more than 20% of the rated and unrated lists.

A list of albums and artists from and by which songs have been played for this user in the last 3 hours is copied or otherwise made available to the process set forth herein and the songs for this playlist are picked via PlaylistGenerator.pickSongs( )). A list of all the picks needed is made (via PickList). For example, if there is a playlist of 50 songs, the list may contain 10 entries for explicit songs, 20 for implicit songs, and 20 for unrated songs.

While there are still songs to pick, iteration is made through the following cycle:

a. randomly pick a song list type (explicit, implicit, unrated) with a probability based on the proportion of songs to come from each list;

b. pick a random song index from that list (which has already been sorted in descending order of score), based on the following formula (via SongGroup,pickRandom( )):

sizeOfList=the number of songs in this list;

random=a randomly-chosen number between 0 and (sizeOfList−1)0.01; and index of song to pick=((rand7)/sizeOfList−17)*(sizeOfList−1)).

This formula allows songs to be picked somewhat randomly, while guaranteeing a high probability that the song picked will come from highest scored. The higher the ranking of the song in the score matrix, the higher the probability it will be picked. This algorithm scales well for any size of list because it is rank-based, not just score based.

The song at that index is removed from the list. If for some reason a valid song is not obtained (possibly the song list already exhausted), another song is added to the list of types to pick of this type. Once a song is picked, its album and artist information are obtained.

If the artist is not a "Various Artist" and the sum of the number of songs played by this artist and already picked for this playlist by this artist is greater than or equal to 3, this song cannot be played under the RIAA (Recording Industry Associates of America) and/or DMCA (Digital Millennium Copyright Act) rules. Other rules may also be implemented in the present invention to accommodate statutory and other rights and/or restrictions.

The song is marked as "rejected" and another song is added to the list of songs to pick from the same list the rejected song was picked from. The same test is performed for albums, with the maximum played, for example, being 2. If the song was picked successfully and was within legal or other boundaries, the number of songs picked from this album and by this artist is incremented. The song is added to the final list of songs for the playlist and the order in which the song was picked for the playlist is marked, or noted.

If, for some reason, a playlistSize number of songs is not obtained, the existing playlist is deleted and popular songs are added to the song hashtable, and the song lists are re-sorted and re-picked ignoring the user's genres selections.

The picking of news clips is done simply by picking a specific number of unique news items that are in the specified bandwidth format. A list of available news clips is stored in the song information cache. Ads may be picked in the same way as news clips are picked. However, a difference may be present in the different number of ads to pick. Tips may also be picked in the same manner as news clips, with a different number of tips to pick.

The order of the songs may be randomly shuffled in the playlist and the playlist may be serialized and saved to the database. Finally, the ASX file may be returned to the player 108.

Every 5 minutes, the player 102/108 "pings" the Playlist Generator 122. If the playlist is stale or has 8 songs or less left in it, the playlist generator regenerates the playlist and replaces the one previously saved in the database.

As an additional enhancement to the present invention, playlists from commercial and other radio stations throughout the United States, and elsewhere, are made available so that playlists may be affected by such radio stations and by popularity of particular musical works.

In achieving the Internet radio of the present invention, a rating acceptor 130 in the form of the Rating WidgetServlet routine (Appendix 2, page 222) takes HTTP requests to rate and gets ratings for songs, albums, and artists. When a rating is saved, it written to the ratings database and if the user who rated the item is designated as being in the ratings cache, the rating change is added to the queue of ratings updates.

Once every minute, the ratings updates are sent to all the ratings caches that have registered their IP address in the database. Every hour, the list of ratings caches are retrieved from the database. Every ten minutes, the list of users in the cache are retrieved from the database.

The song information cache is implemented through the SongInfoCache routine (Appendix 2, page 265) and may be a large in-memory cache of relatively static data that is used in playlist generation. It may include a list and hashtable of all songs which includes identifying numbers, media formats available, average rating, artist and album information, explicit lyrics mark, genres the song is in, and radio stations that play the song. Also, other information may be included in the song information cache, including: a hashtable of artist information; a hashtable of album information; a list and hashtable of all ads including identifying numbers and media formats available: a list and hashtable of all news clips including identifying numbers and media formats available: a list and hashtable of all audio tips including identifying numbers and media formats available: a lists of the 1000 most popular songs in each media format; lists of all songs in each genre; and a cache of frequently-accessed ratings profiles. This last cache is seen in the RatingsCache 132 routine (Appendix 2, page 211). The song information cache is completely rebuilt once a day from the database.

The ratings cache caches the entire ratings profile for the top 100 users who are known to be accessed frequently. The ratings cache is implemented through the RatingsCache routine (Appendix 2, page 211). On startup, the ratings cache registers its IP address in the database to subscribe to ratings updates. These users are typically DJs (users with broadcasted or subscribed ratings) that have many subscribers, or users who simply use LAUNCHcast frequently. Each ratings cache recalculates the most frequently-accessed users and writes it to the database every 8 hours. At that time, the entire cache is discarded and reread from the database to erase any lingering corruption. Each ratings cache checks the database every 10 minutes for changes in the list of users to be cached and updates the ratings cache as appropriate.

Note should be taken that many of the parameters set forth herein are discretionary and advisory. Consequently, those properly and legitimately implementing the present invention may alter such parameters, such as when events occur and event timing as above, according to system operation preferences.

For each user who is not in the ratings cache, their ID is appended to a list of users whose profiles need to be retrieved from the database 160. Users who have been added to the cache recently have their profiles added to the list of ratings to be returned to the PlaylistGenerator 122 routine (Appendix 2, page 158). All non-cached users' ratings are retrieved from the database 160, are appended to the list of ratings, and are returned to the PlaylistGenerator 122. The album and artist ratings are retrieved in a separate query from the song ratings. Each runs in its own thread in parallel for optimal performance.

The media gateway 120 is a Java servlet that brokers the relationship between the end user's (Windows Media) Player 108, the database 106, and media library, or Windows Media Server, 180 and logs all media access. The MediaGatewayServlet routine (Appendix 2, page 112) performs this function. Because the client's Windows Media Player playlist (.sax file) does not contain any information about the actual songs or ads in the user's playlist, the media gateway 120 contains the logic described below to redirect the user's player to the correct media address on the media library 180.

For security reasons, the media gateway 120 may check to see that the client 102 is accessing it from the Windows Media Player client 108 (and not a web browser or other application). If not, it may redirect the user to an error media file. The media gateway 120 then pulls the user's ID off the query string and retrieves that user's playlist object from the database 160. The gateway 120 inspects timestamps in the user's playlist object that indicate when the user last heard an ad, tip, song or other media item and determines if it is time to insert an ad, tip, or news item in the datastream, or just play the next song.

If the user has not heard an ad, for example, for a predefined period of time, the media gateway 120 resets an ad timestamp and retrieves an ad path from the user's ad playlist and passes that MMS (Microsoft Media Server) redirect instruction/address to the end user's Windows Media client 108. If no ad is available, the process continues and plays the next song in the user's playlist. If it is not time to play an ad, the timestamp is checked to see if it is time to play a tip. The process then follows the same logic, above, for ads to retrieve and play a tip, instead of an ad. If it is not time to play an ad or tip, the timestamp is checked to see if it is time to play a news item. The process then follows the same logic as for ads to retrieve and play a news item.

If it is not time to play an ad, tip, news item, or other stream (the usual case), the media gateway 120 retrieves the path of the next song in the playlist and returns that address via an MMS redirect to the client's Windows Media Player 108. In all cases, the mediaID of the ad, tip, or song played is logged in the database 160 under that user's ID. This logging information is used to display what the user is listening to on the user's station page and under the "Who's Listening" page. These pages may be associated with the central home page 148 in a manner similar to that of the user pages 140 as history data in the playlist generator, and in calculating a Top 100 chart for the most popular songs and/or streams.

While there may be some preference for an "on-demand" service such that individuals may pick their own radio playlists, the element of randomness and pleasant surprise is inherent in the present invention. Additionally, statutory requirements prevent users from turning the Internet into their own home stereo system. "On-demand" service is generally prevented by statute and may be a violation of copyright. Consequently, any statutory regulations, such as the Digital Millennium Copyright Act (DMCA), and other limitations can be programmed automatically into the present invention. In so doing, the present invention complies with all applicable law and delivers to the user a musical experience generally aligned with his or her preferences.

Many users often listen to music while doing programming or the like. Such music can now be delivered over the Internet via the user's very own radio station through the present invention. Additionally, users may select other individuals or DJs, to influence their musical playlist just as the user does. The DJ, online or otherwise, becomes an additional factor in influencing the user's preferences and playlist. Some individuals may act as real DJs, serving to provide content to an audience of subscribers through the Internet. Programs of special interest may also be developed and subscribed to by listeners using the present invention. Through the heavily hyperlinked (but easily understandable) interlace set forth in the Figures and described above, a user may establish musical (or other data stream) preferences. In establishing such preferences, the music played to the listener is tailored to that listener and provides an enhanced musical experience on an individual basis.

While the present invention has been described with reference to a preferred embodiment or to particular embodiments, it will be understood that various changes and additional variations may be made and equivalents may be substituted for elements thereof without departing from the scope of the invention or the inventive concept thereof. In addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

I. Alternate Embodiments

Group 1

Embodiments of the present invention relate to Internet data streams and the like, and more particularly to a radio broadcast system over the Internet where each individual user is able to set his or her preferences regarding, or influencing, the songs played.

As previously discussed, FIG. 1A shows the general structure of the LAUNCHcast system. The player provides the interface allowing the audio/and or video broadcast to take place at the user's computer. Song or video information is available through both the Player and the accompanying data window.

Figure 2:
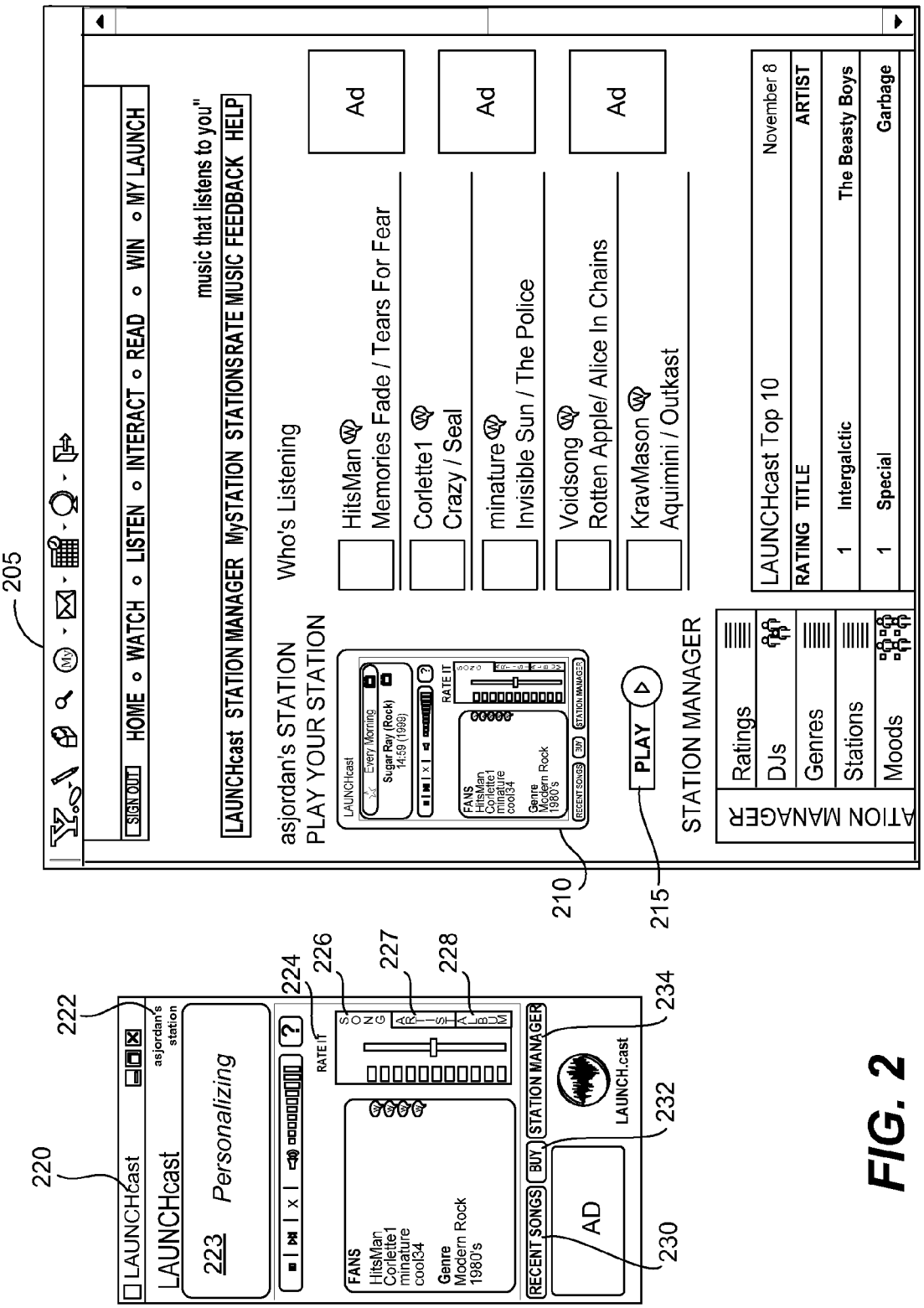
FIG. 2 shows an initial desktop with two browser windows arising from an embodiment of the present invention.

FIG. 2 shows an initial desktop with two browser windows arising from an embodiment of the present invention. In FIG. 2, the initial data window 205 is shown that first appears when the present invention is invoked or called up by the user. In alternative embodiments, the present invention may have a shortcut located in the start-up folder that allows the broadcast to begin every time the user boots up his or her computer. Additionally, a single link may initialize the Player of the present invention. As shown in generally the middle of FIG. 2, a thumbnail 210 above a "PLAY!" button/hyperlink 215 is shown that initiates the Player window 220 shown to the left of the data window. A song information data window 223 indicates its initialization by displaying a "Personalizing" or "Tuning" message.

The playback window 220 is highly interactive with several embedded hyperlinks. In the upper right-hand corner of the playback window, the indication of "asjordan's Station" 222 is made. By clicking on this, more information about the current station may be given and/or the ability to change such station. In the right center of the playback window, a "RATE IT" window indicator 224 is given allowing the individual to rate the current "SONG" 226, the "ARTIST" 227 performing the current song, and/or an "ALBUM" 228 containing the song. Below the "RATE IT" indicator, hyperlinks to "RECENT SONGS" 230, "BUY" 232 and "STATION MANAGER" 234 are present allowing the user to travel to those destinations and either learn more information, purchase or review purchasing information about the current album being played, as well as access the station manager for the present invention.

Below the song information window 223 as shown above, icons are given for Play/Pause, Skip this Song, and Never Play It Again ("Delete"), and a Volume control. The question mark ("?") shown below the "Personalizing" window is a hyperlink to a Help file for the playback window and the Internet Radio System of the present invention. These icons are also shown in the other playback window Figures.

The initial data window 205 may include a station manager link, MyStation link, DJs link, Top 100 link, Feedback, and help links A Who's listening section may show members listening.

Various advertisements may be displayed on initial window 205 and player 220 (e.g., AD box). In various figures, including FIG. 2, a W-bubble (whisper bubble) is shown for other members of the system that are online and available for instant messaging.

Figure 3:
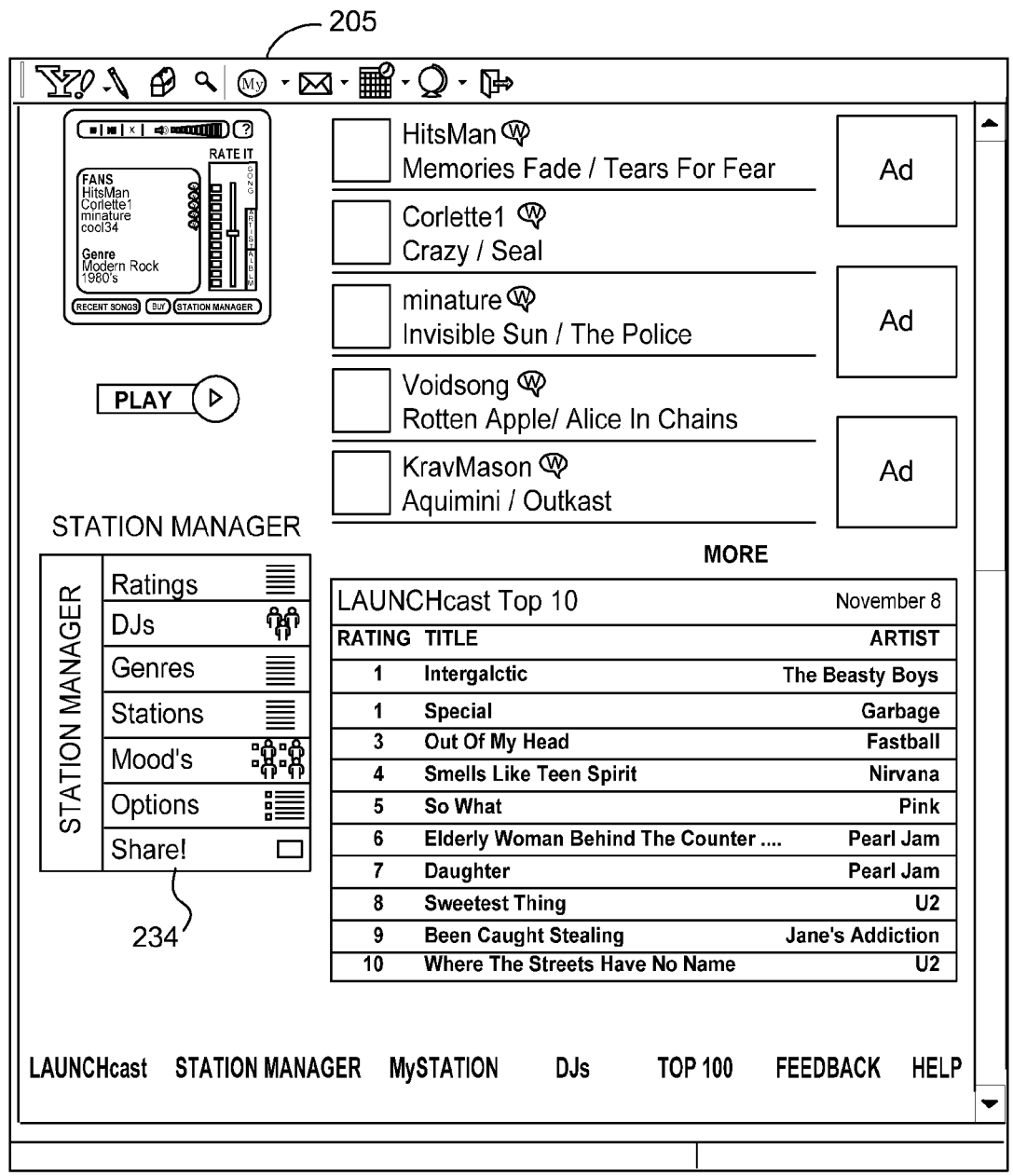
FIG. 3 is a continuation of a larger window in FIG. 2 in accordance with an embodiment of the present invention.

FIG. 3 is a continuation of a larger window 205 in FIG. 2. At the left-side of FIG. 3, a station manager 234 is illustrated that includes a ratings button, DJs button, Genres button, Stations button, Moods button, options button, and a share button. In one embodiment a list of Who's listening and the music they are listening to is provided. A list of top songs of the system may also be presented.

FIG. 4 shows the smaller player window and the larger data window used in an embodiment of the present invention. FIG. 4 shows a desktop display of the system in action. A tool tip 405 may be given when the cursor hovers over the song title in song information window 223, such as showing "You rated this album". The same may be similarly true for the artist and the album currently playing. Note should be taken that just as the song rating indicators is highlighted and active in the middle right section of the playback window, the song title is highlighted in the upper portion of the playback window.

Additionally, the left and center middle portion 410 of the playback window provides information regarding fans who have strong positive feelings about the current song, artist, and/or album, as well as an average rating for all users or some subset of users on the system.

Figure 5:
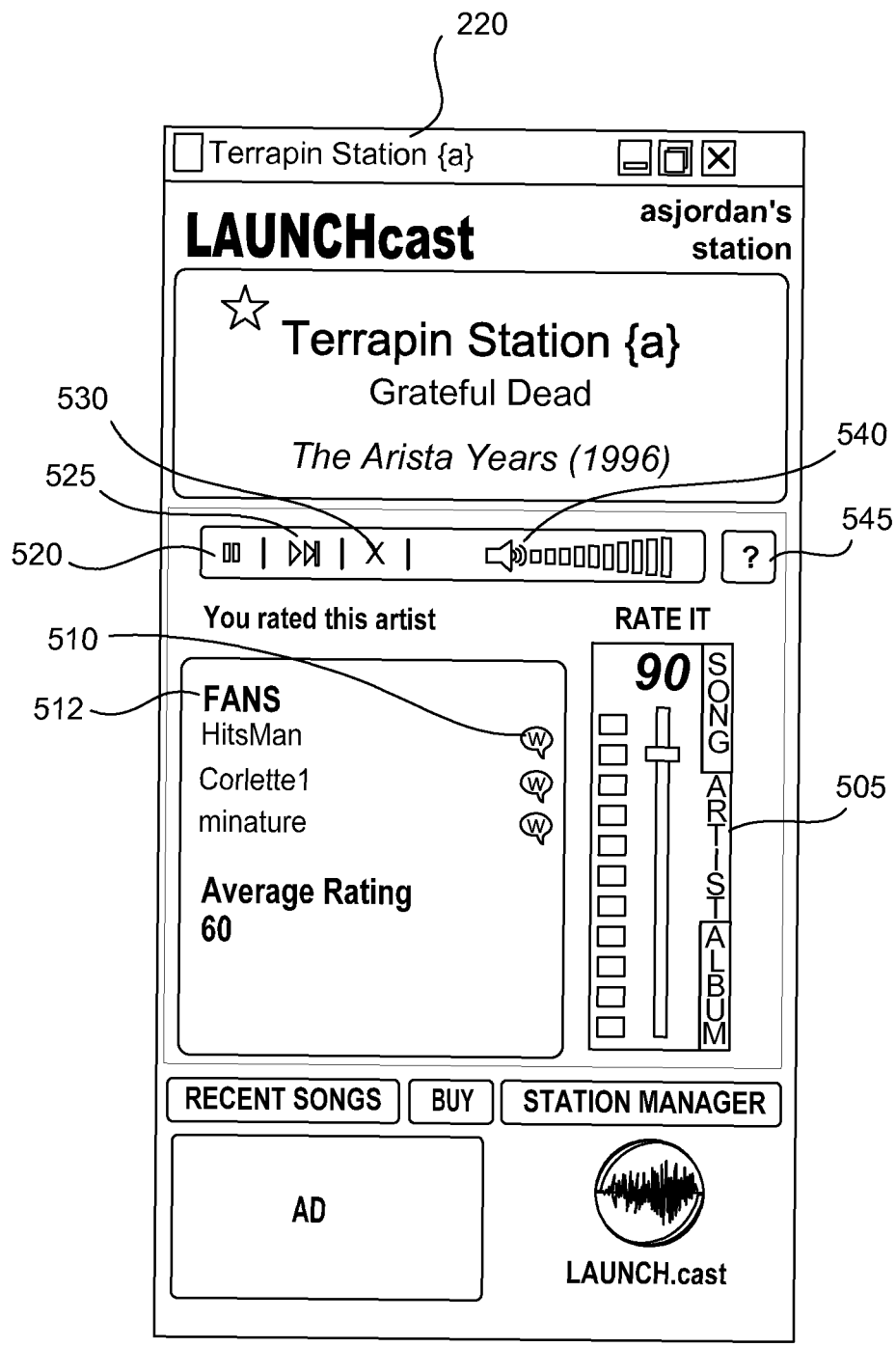
FIG. 5 is the smaller player window of FIGS. 2-4 with the artist highlighted.

FIG. 5 is the smaller player window of FIGS. 2-4 with the artist highlighted in the rating indicator 505. FIG. 5 shows the highlighted artist rating indicator corresponding to the highlight of the group in the work indicator window. Of note are the small balloons 510 on the right-hand side of the central dark area across from the "Fans" 512. These balloons may have a letter "W" ("whisper mode") inside of them to indicate another listener is currently online and can be engaged via the instant messaging function.

FIG. 5 also shows the icons given for Play/Pause 520, Skip this Song 525, and Never Play It Again 530 (a cross-out mark for "Delete"), and a Volume control 540. The question mark ("?") 545 shown below the "Personalizing" window is a hyperlink to a Help file for the playback window and the Internet Radio System of the present invention.

Figure 6:
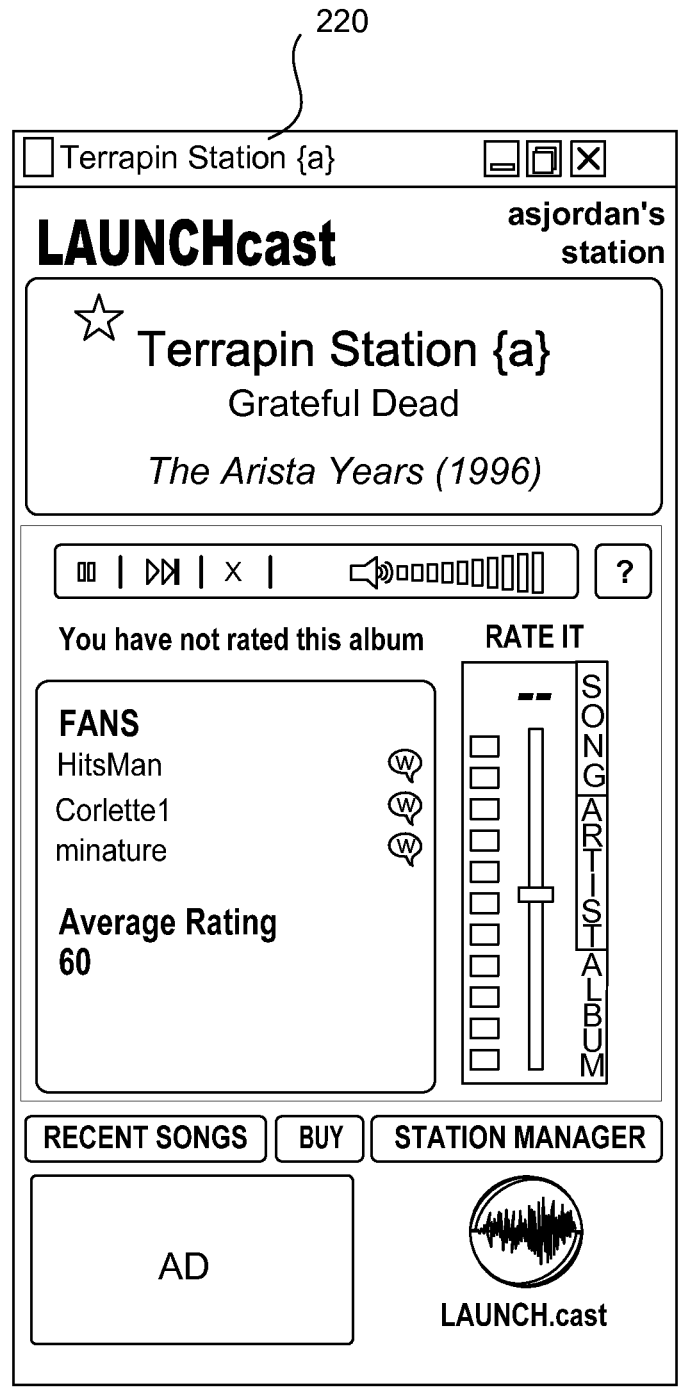
FIG. 6 is the player window with the album highlighted in accordance with an embodiment of the present invention.

FIG. 6 is the player window with the album highlighted. FIG. 6 shows the album highlighted both in the ratings indicator and the work display window.

Figure 7:
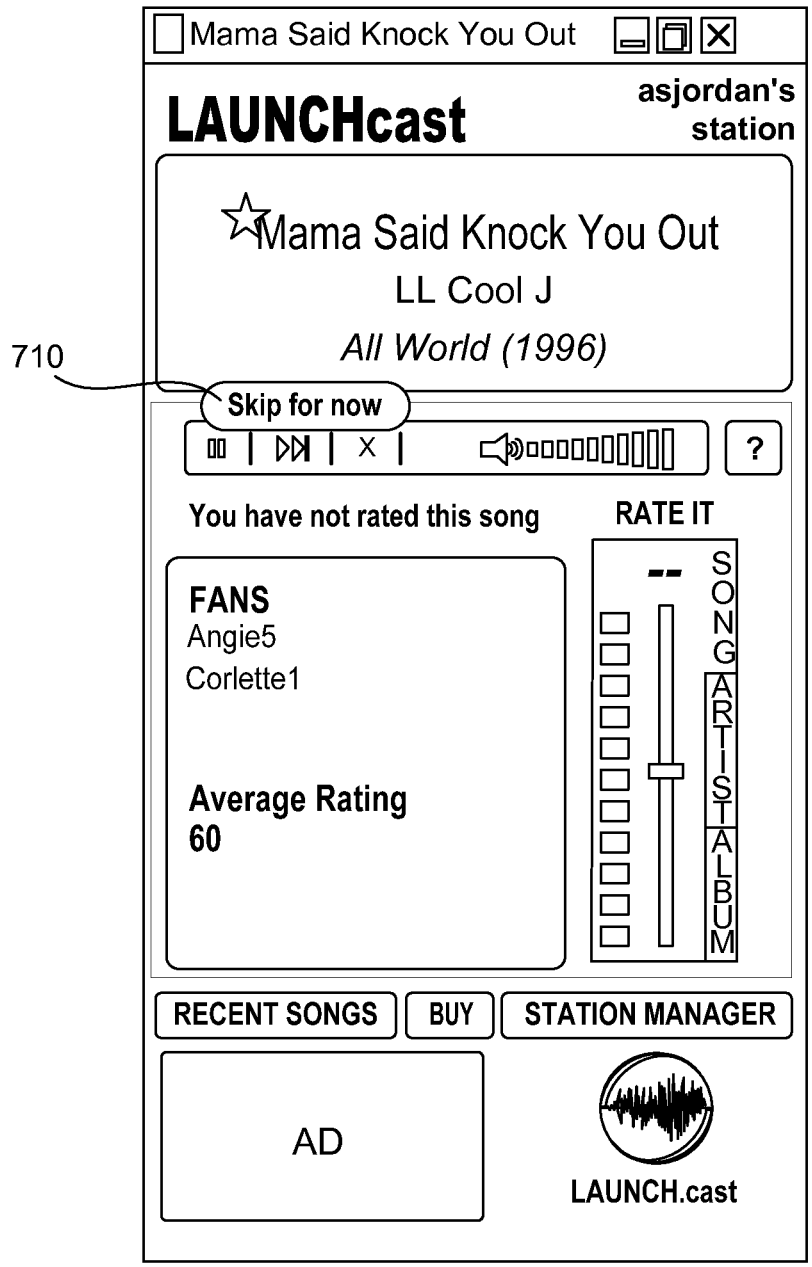
FIG. 7 shows the player window with the song highlighted and the tool tip indicating "Skip for now" in accordance with an embodiment of the present invention.

FIG. 7 shows the player window with the song highlighted and the tool tip 710 indicating "Skip for now." FIG. 7 shows the song highlighted both in the ratings window and the work display window. The bottom portion of the playback window of FIG. 7 shows graphic information that may be used for advertising or other hyperlinks. In generating the playlist of the present invention, the user can be informed as to why a particular song was picked.

Figure 8:
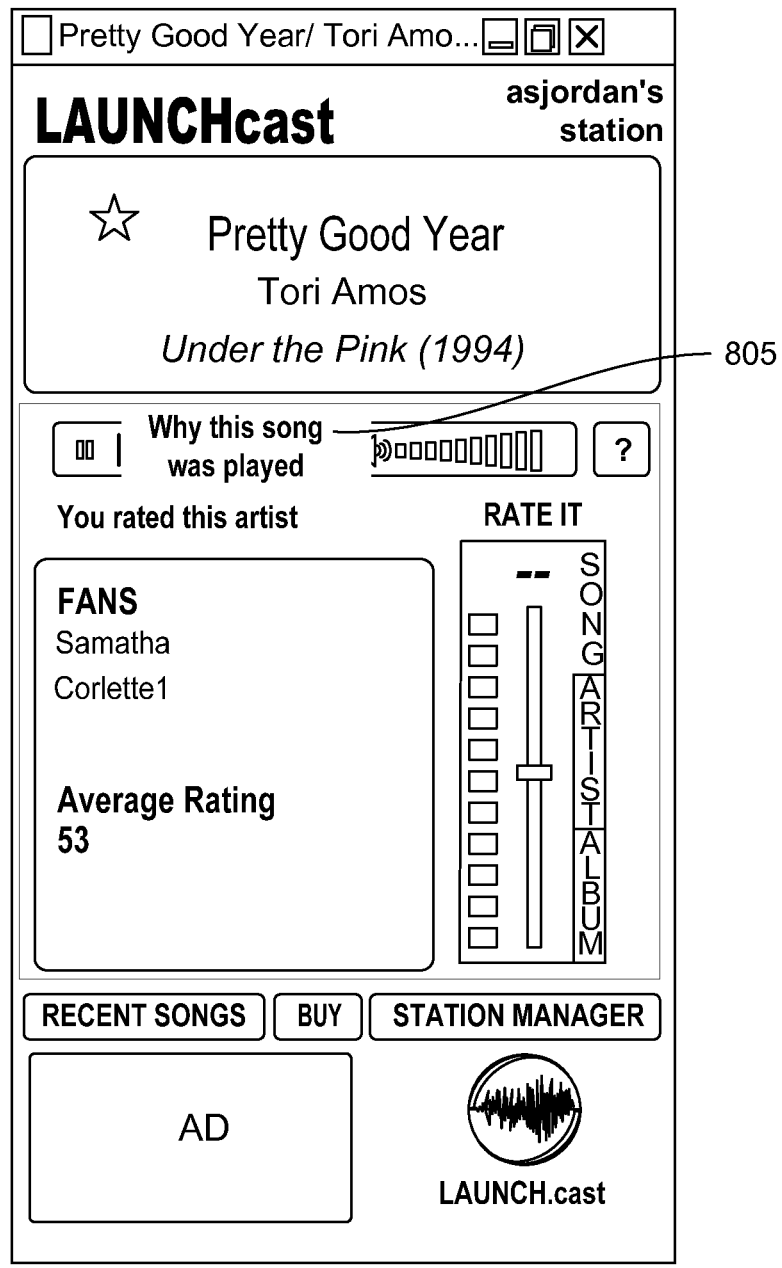
FIG. 8 is the player window with the tool tip indicating the reason why the song is being played in accordance with an embodiment of the present invention.

FIG. 8 illustrates the player window with the tool tip 805 indicating the reason why the song is being played. In FIG. 8, a tool tip arising when the cursor is hovering over the "You rated this artist" area gives an indication of why the song is played.

Figure 9:
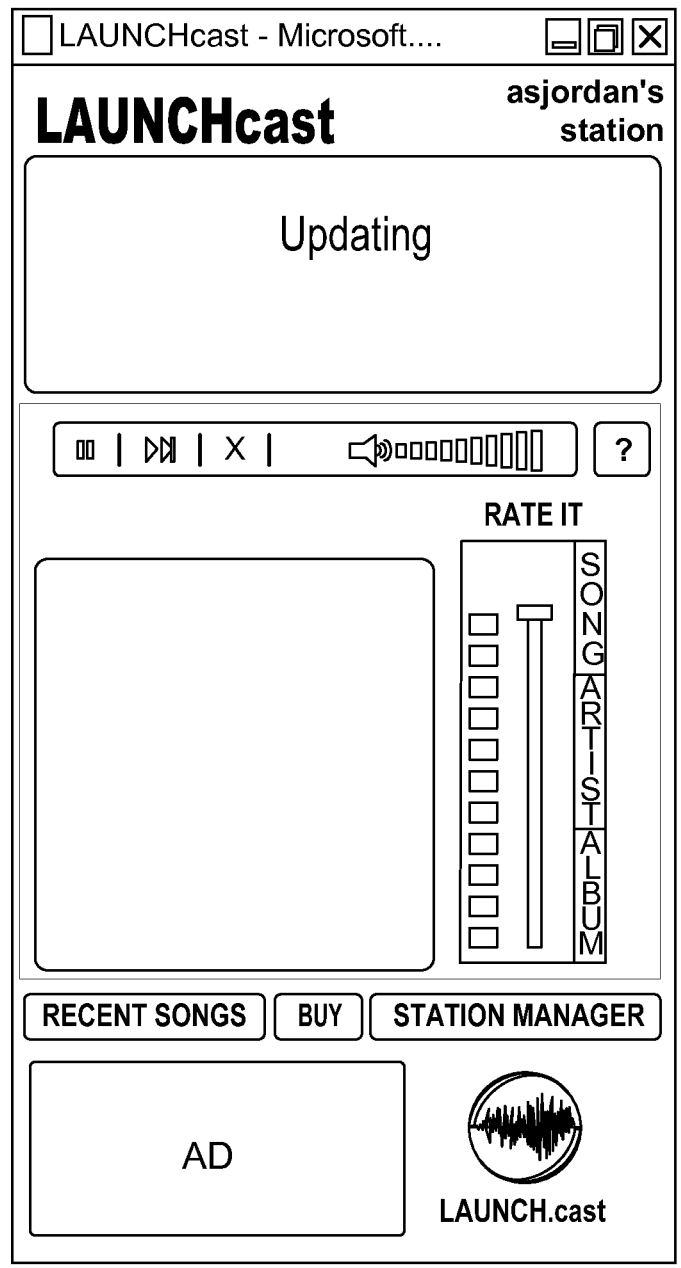
FIG. 9 is the player window showing to the viewer that it is "Updating" its broadcast in accordance with an embodiment of the present invention.

FIG. 9 illustrates the player window showing to the viewer that it is "Updating" its broadcast. FIG. 9 shows a display given to the user to indicate ongoing activity of the playback system while it is updating and obtaining a new data stream from the system. Visual activity in the form of animation assures the listener/view that the short span of silence, or "dead air," following a song is only temporary and that a new song will soon play. The remaining Figures all show windows associated with the present invention that allow for feedback either to system or information presented to the individual.

FIG. 10 is a close up view of the initial LAUNCHcast window 205 of FIG. 2. FIG. 10 illustrates an example of 22 members listening and what the members are listening to. The whisper balloon ("W") is also illustrated by each online member. An artist search window is also provided.

Figure 11:
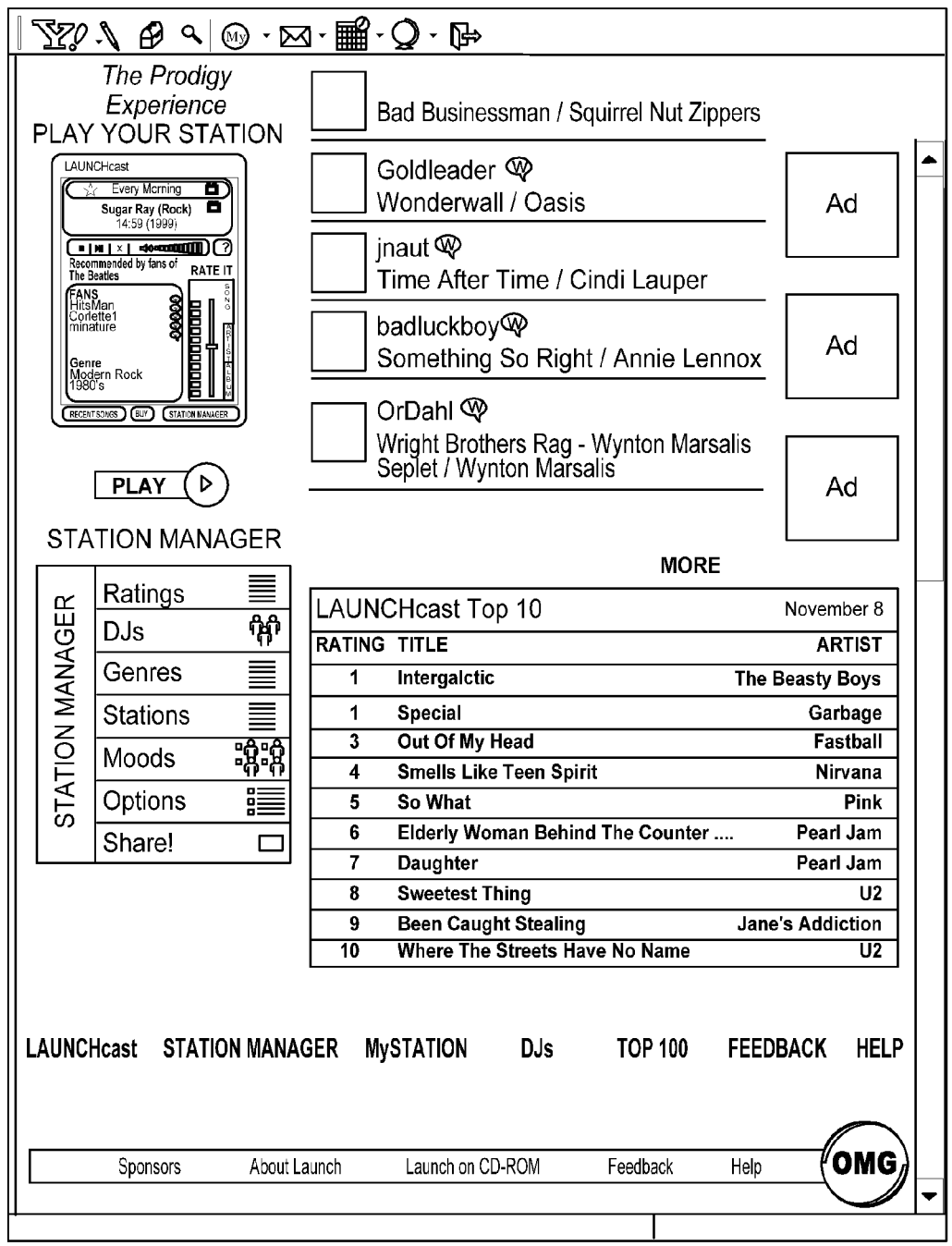
FIG. 11 shows the bottom half of a second and different initial LAUNCHcast screen similar to that in FIG. 10 in accordance with an embodiment of the present invention.

FIG. 11 shows the bottom half of a second and different initial LAUNCHcast screen similar to that in FIG. 10. This examples shows in more detail a top ten list of song titles in the system.

FIG. 12 shows the player window with its "RECENT SONGS" tool tip 1230 ("Review and rate songs you have heard recently"), as well as the data window displayed in response to selecting the recent song's hyperlink of FIG. 2. Additionally, the user's ratings "My Rating" may also be shown. In this example, other information may also be displayed explaining why the song was picked (e.g., "this song is a random pick").

FIG. 13 shows a Windows 98 desktop with the smaller player and larger data windows. The "BUY" tool tip is displayed as well as the data window corresponding to the BUY hyperlink. In this example, the user is listening to Madonna's "Ray of Light" on the player and the buy it features bring up information to buy the song/album (top right) and may also indicate other albums the user may like to purchase (bottom right). The user interface may also include features to show whether a user owns an album ("I own it"). In this example, other information such as a listing of tracks on the album may also be provided.

FIG. 14 shows the desktop of the player and data windows with the player window showing the "STATION MANAGER" tool tip 1410 ("Personalize Your Launchcast stations"), as well as the data window corresponding to the STATION MANAGER hyperlink in the player window. The Your Ratings features permits a user to "Review the songs that you've rated highly." The DJs feature permits a user to: "Subscribe to other LaunchCast users as your own DJs, so that their ratings would influence the music you hear." The Radio stations features permits a user to "Select your favorite radio stations, so that their playlists influence the music you hear." An Options features permits a user to "Set your options for new music, connection speed, and explicit lyrics filtering." A Moods feature permits a user to "Add, delete, and edit your mood profiles." A Genres feature permits a user to "Select what genres of music you enjoy listening to." A Share! Feature permits a user to "Tell the world about your Launchcast station."

FIG. 15 is the data window show for selecting the "YOUR RATINGS" hyperlink in FIG. 14. In this example, user's highest rated songs are displayed. The display may include titles, artists, and the user's ratings.

Figure 16:
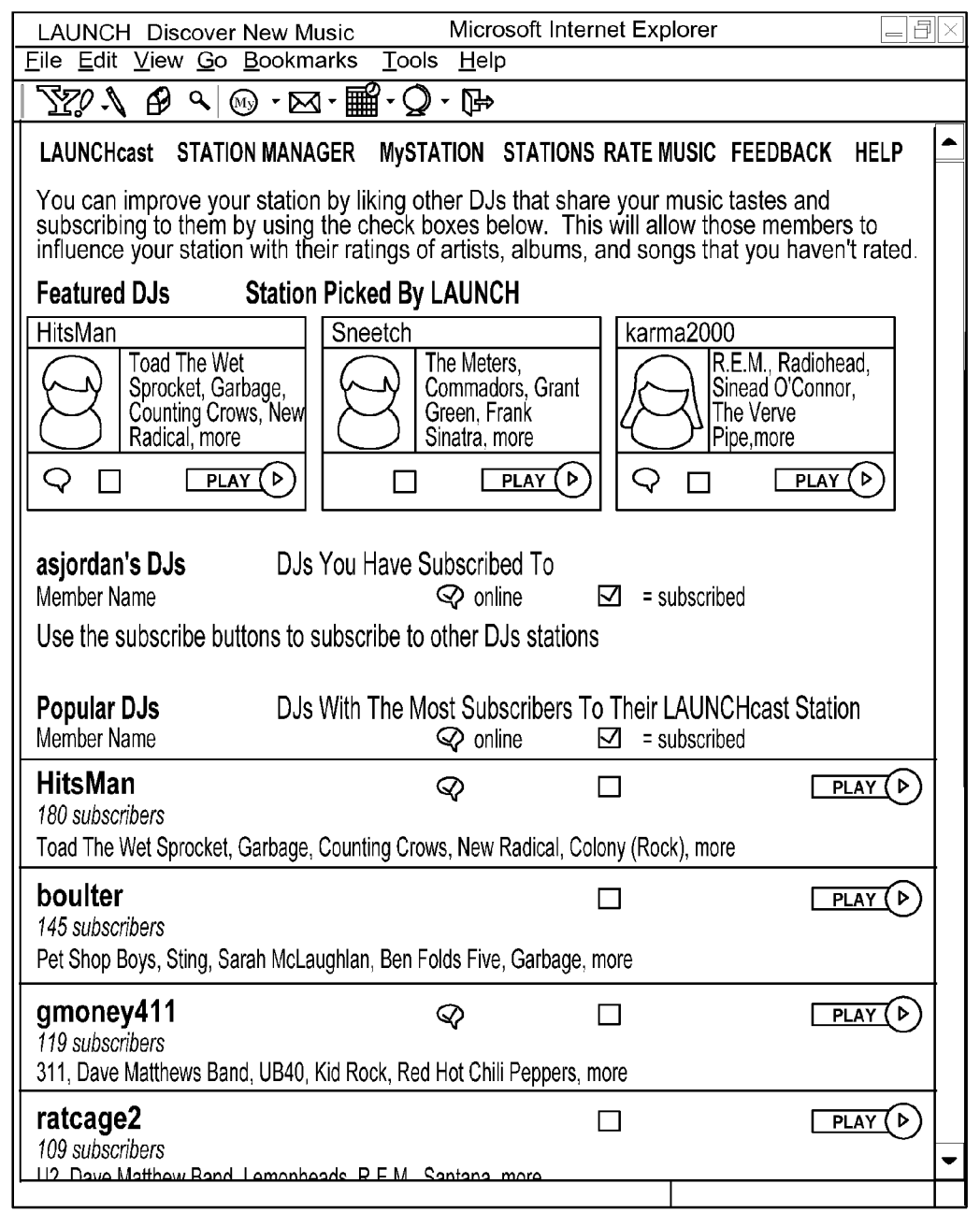
Figure 17:
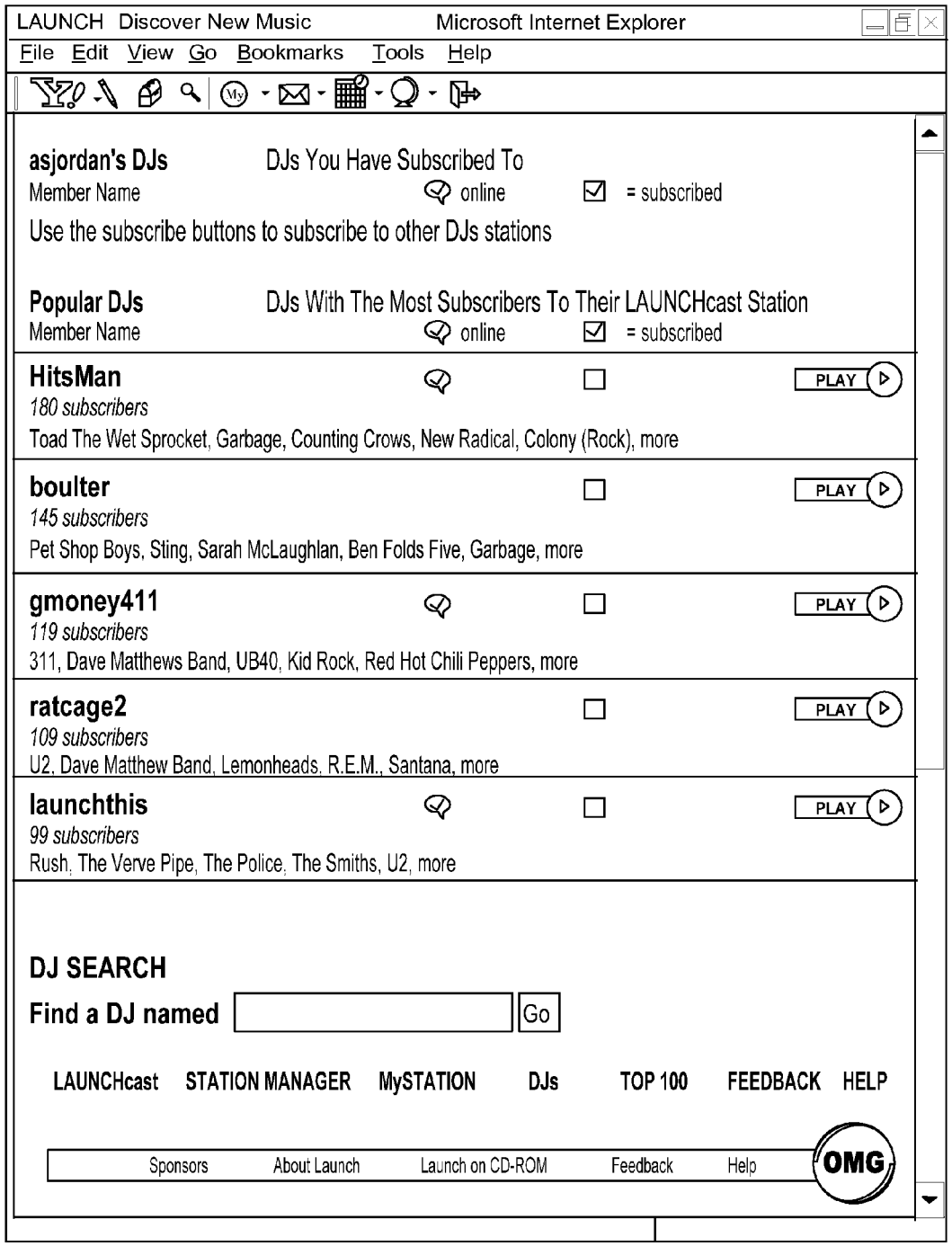

FIGS. 16 and 17 show the data window display when selecting the "DJs" hyperlink of FIG. 14. FIG. 16 shows a list of featured DJs that a user can subscribe to. Additionally, at the top of FIG. 16 is the "MyStation" link A user can find other DJs that share the user's music tastes and subscribe to them using the checkboxes. A list of featured DJs may be displayed (top), DJs the user has subscribed to (middle), and a list of popular DJs (bottom). FIG. 17 shows in more detail the bottom of the display window. In this example, the number of subscribers is shown for each DJ. A play button is provided to play respective stations for each DJ. A DJ search field may be provided (bottom of FIG. 17).

Figure 18:
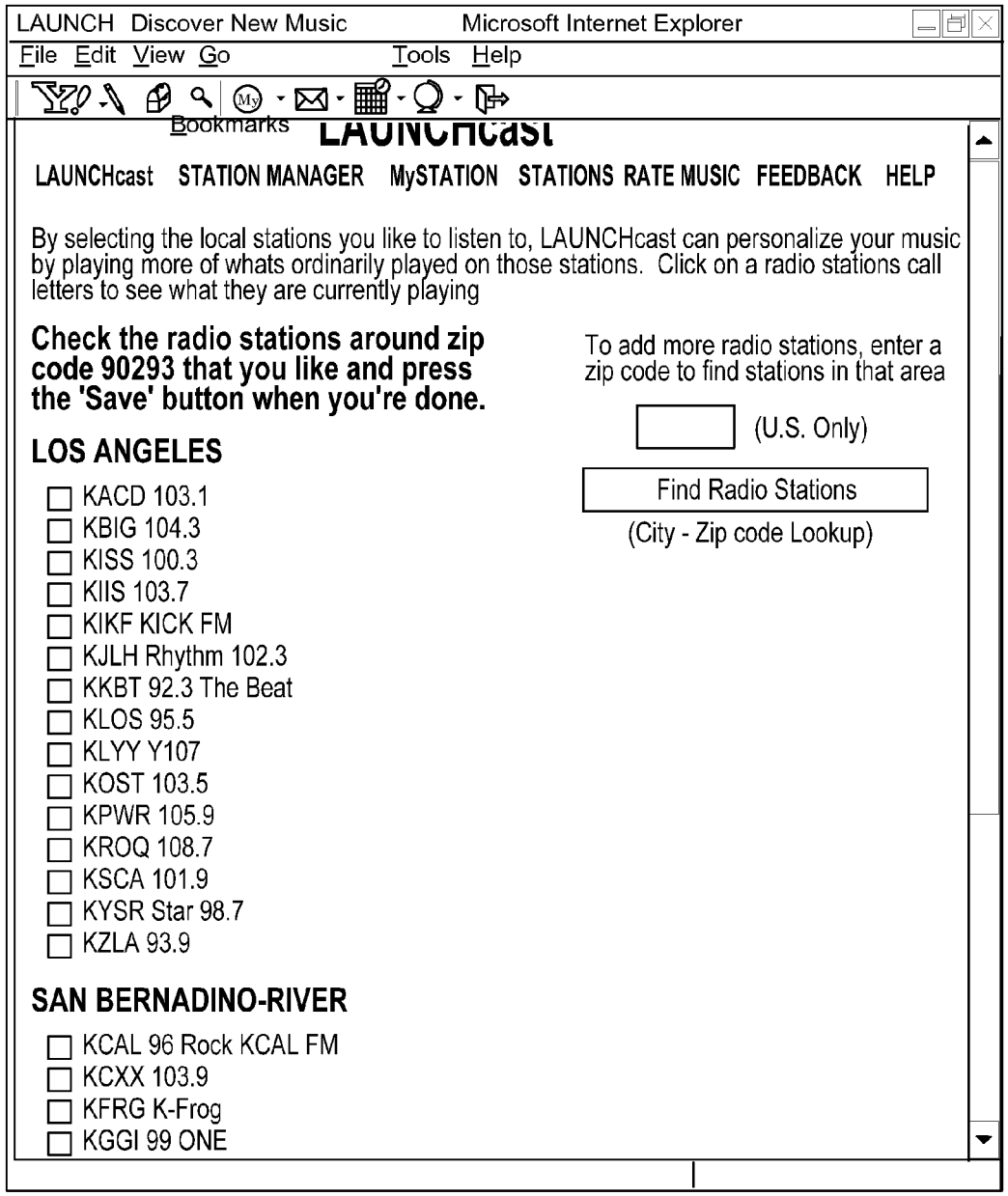
FIGS. 18 and 19 show the data window for selecting the "Radio Stations" link of FIG. 14 in accordance with an embodiment of the present invention.
Figure 19:
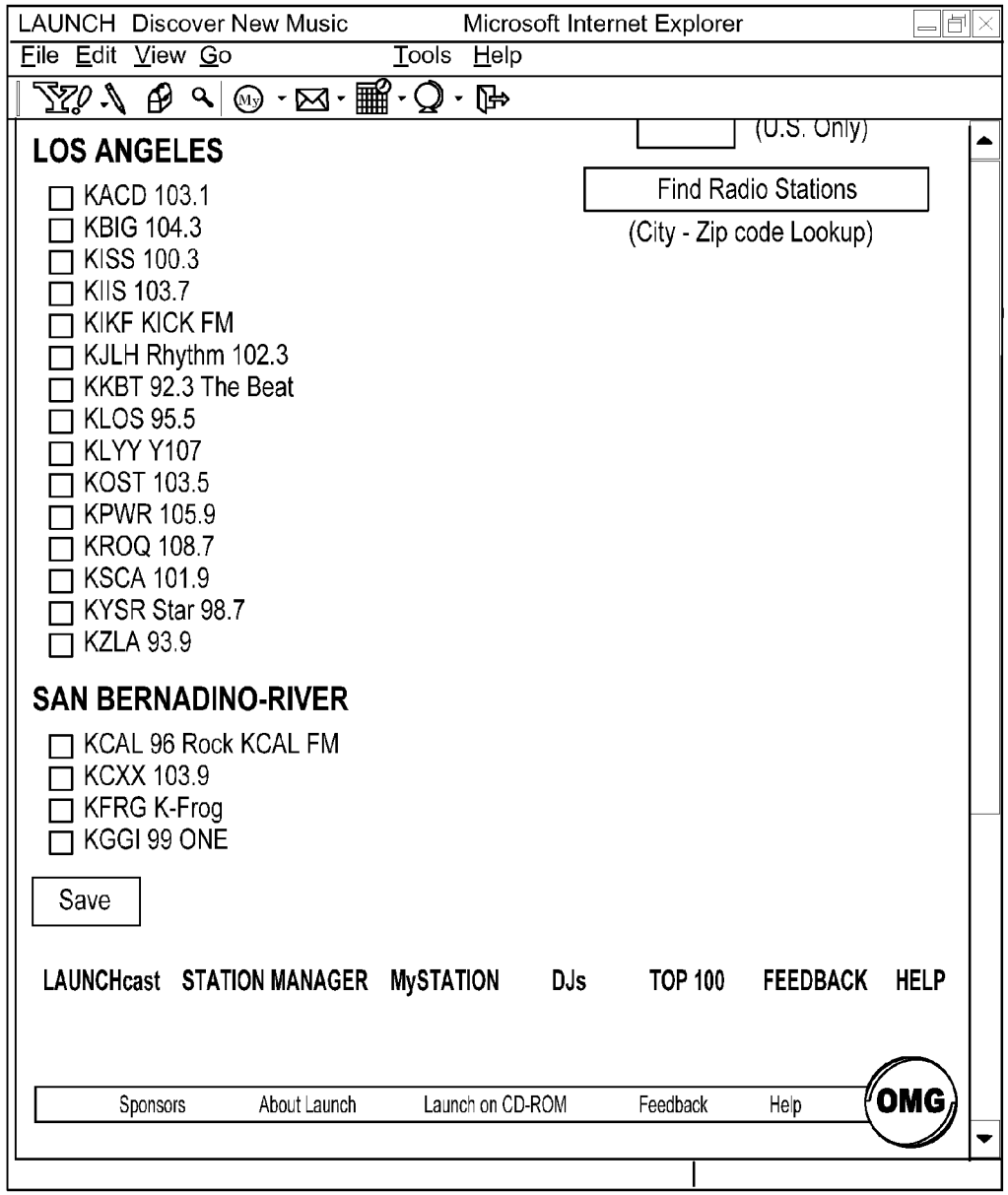

FIGS. 18 and 19 show the data window for selecting the "Radio Stations" link of FIG. 14. FIG. 18 illustrates that a user can select radio stations they would like to listen to. In response, the system personalizes the music by playing more of what's played on those stations.

Figure 20:
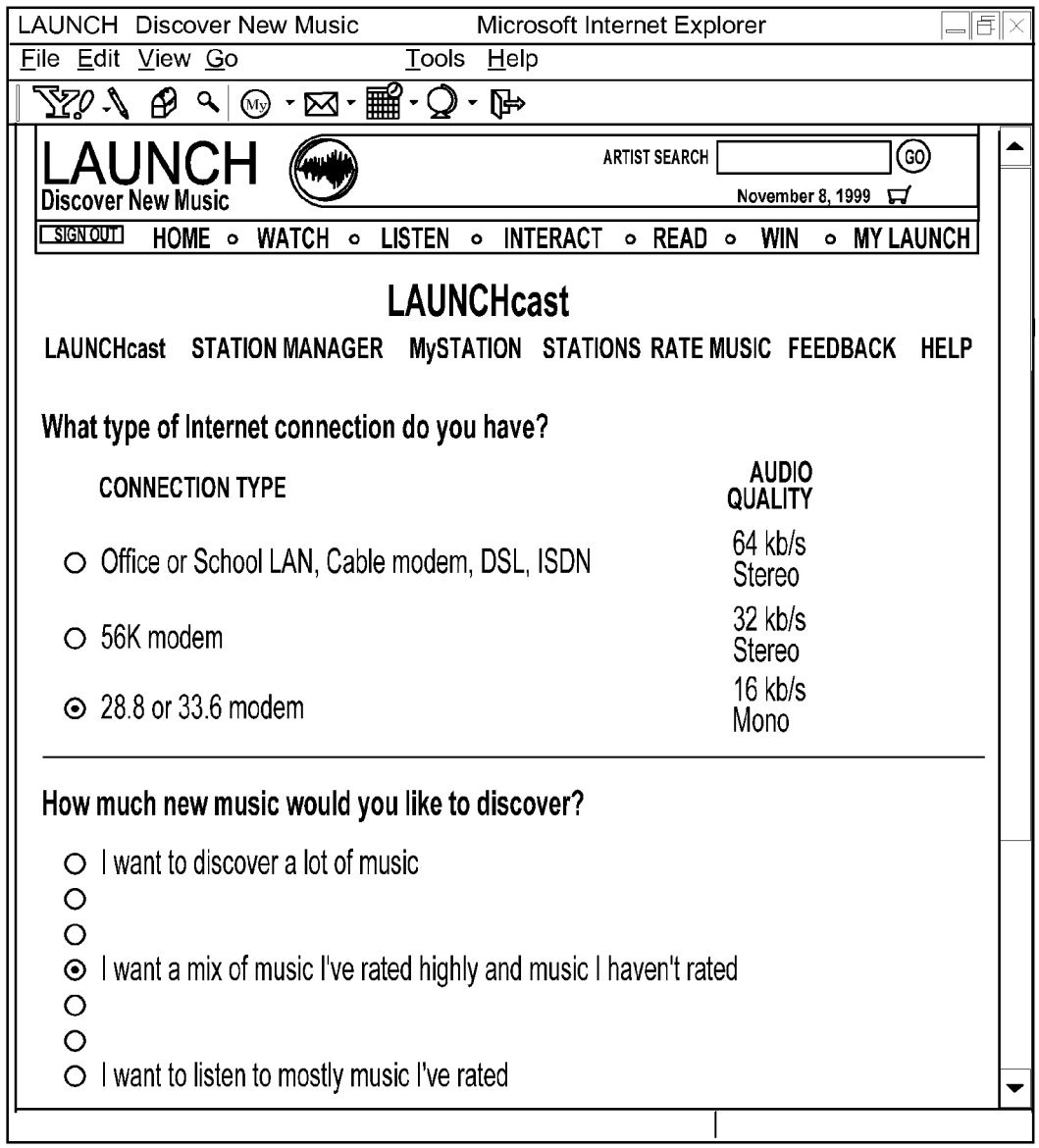

FIGS. 20 and 21 show the data windows displayed when the "Options" hyperlink is selected in FIG. 14. In one embodiment a user can select the type of Internet connection that they have (top). A user may also select how much new music they would like to discover (bottom). FIG. 21 illustrates an option for a user to select whether or not they want to hear music with explicit lyrics.

Figure 22:
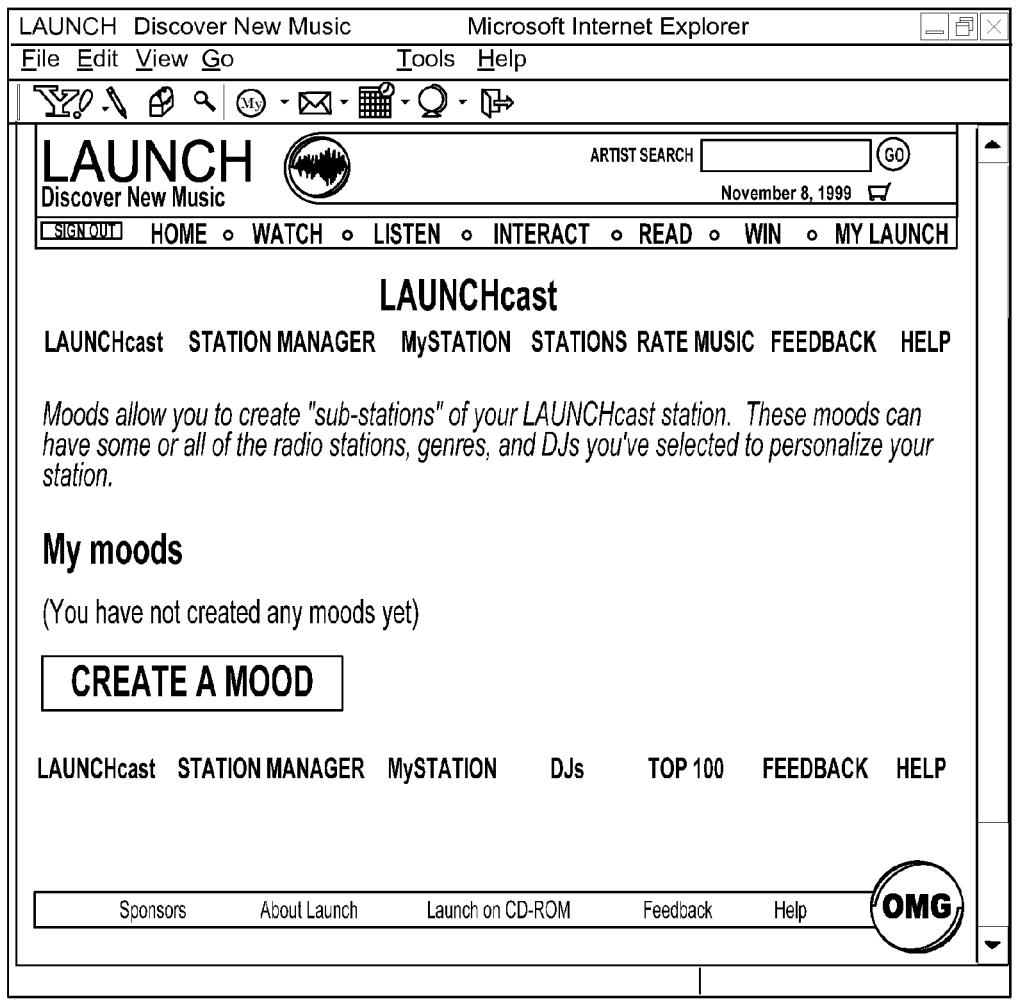
FIG. 22 is the data window display when the "Moods" hyperlink of FIG. 14 is selected in accordance with an embodiment of the present invention.
Figure 23:
FIG. 23 shows the data window displayed when a mood is to be created by selecting the "Create a Mood" link shown in FIG. 22 in accordance with an embodiment of the present invention.

FIG. 22 is the data window display when the "Moods" hyperlink of FIG. 14 is selected. In one embodiment a user may create a mood by selecting a subset of genres, radio-stations, or DJs. FIG. 23 shows the data window displayed when a mood is to be created by selecting the "Create a Mood" link shown in FIG. 22.

Figure 24:
FIGS. 24 and 25 show the data window display when the "Genres" hyperlink of FIG. 14 is selected in accordance with an embodiment of the present invention.
Figure 25:
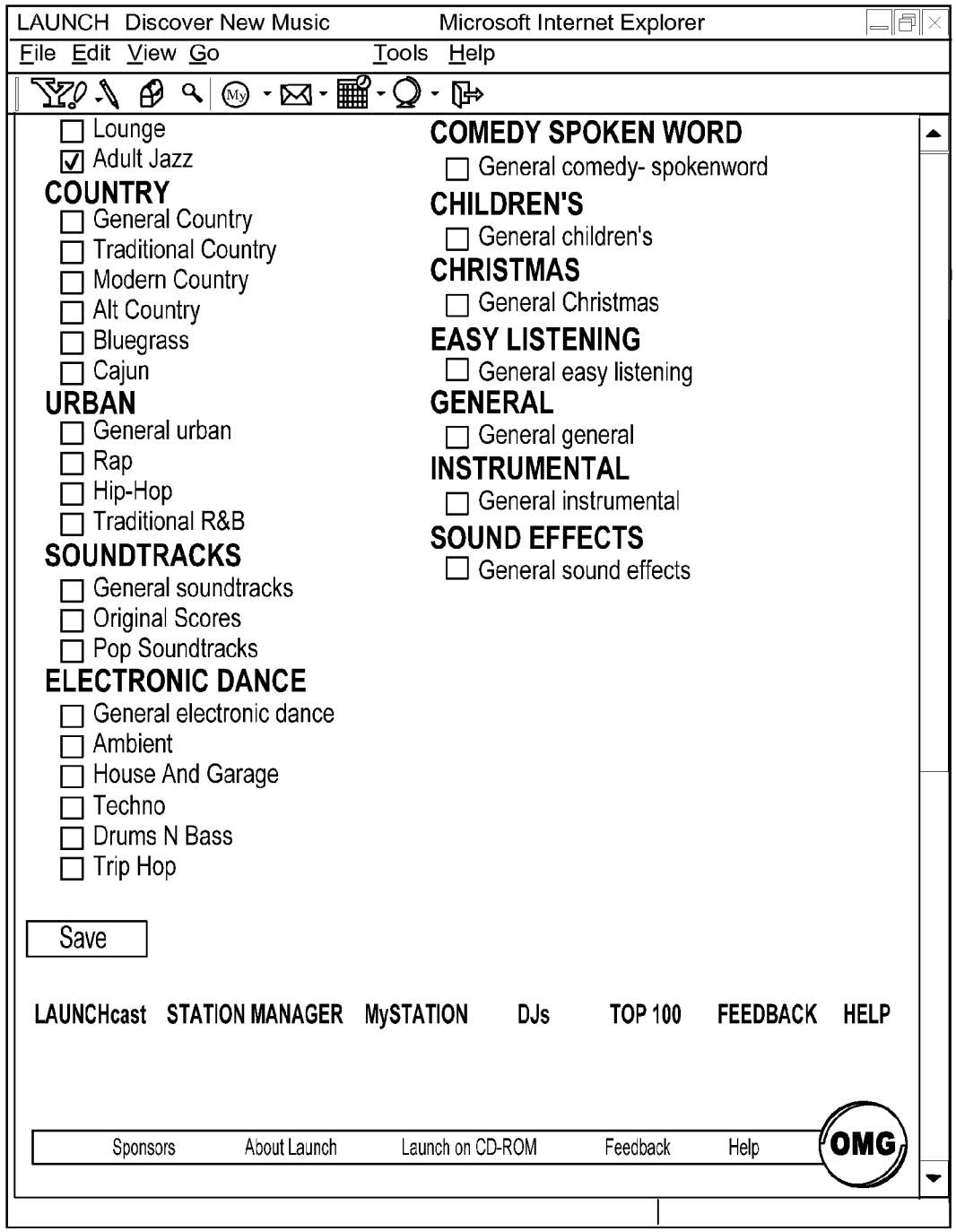

FIGS. 24 and 25 show the data window display when the "Genres" hyperlink of FIG. 14 is selected. FIG. 24 provides an option for the user to tell their personalized DJ which kinds of music they listen to. The information is used to play similar music on a personalized station. A link may be provided (bottom) for a user to find other DJs who share their music tastes.

Figure 26:
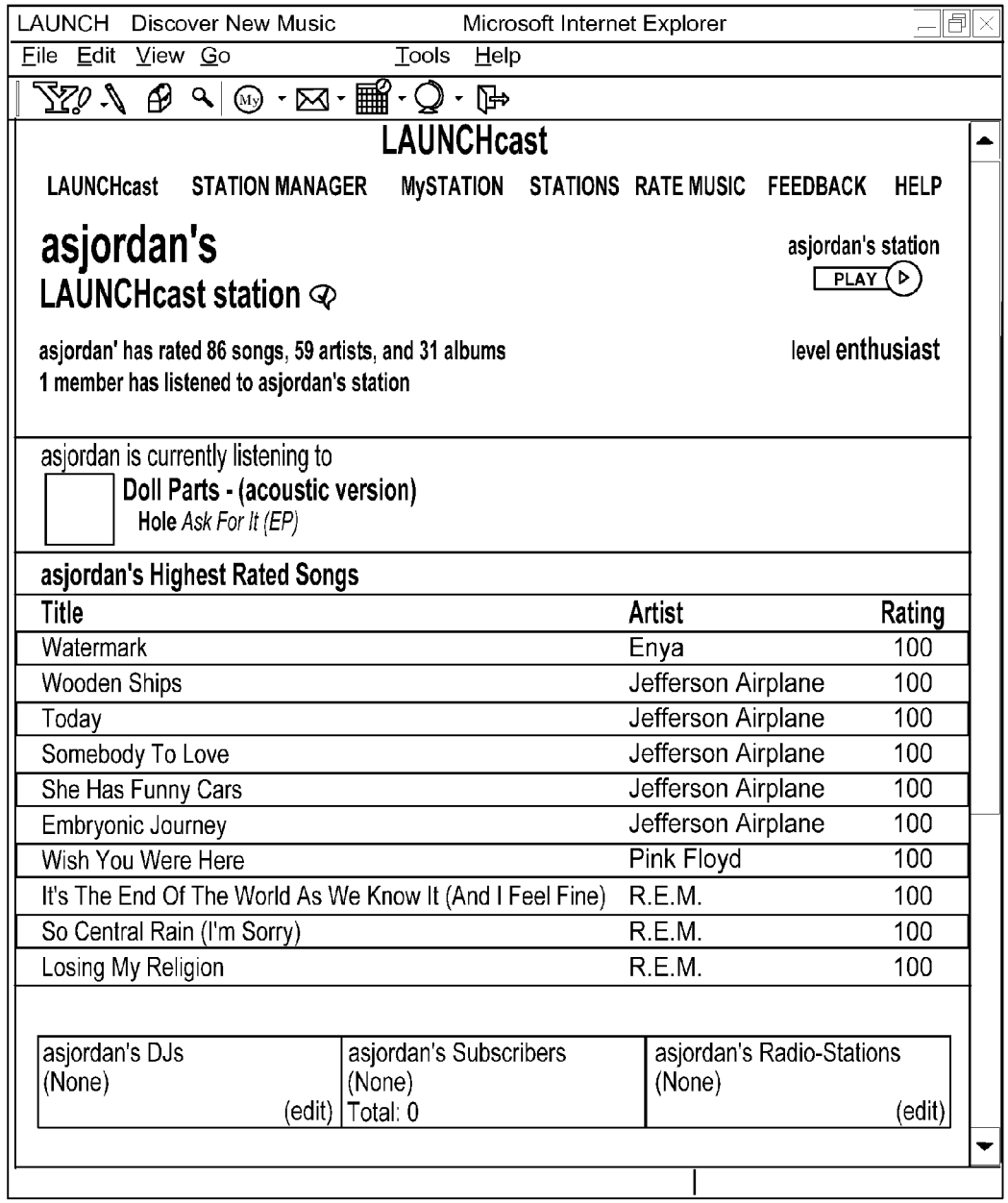

FIGS. 26 and 27 show the data window displayed when the "MySTATION" link is selected as shown at the top of FIG. 26. In the example of FIG. 26, information on asjordan's station is displayed. This may include asjordan's DJs, asjordan's subscribers, artists played on asjordan's station, the current song being played on the station, and a list of highest rated songs on the station.

Figure 29:
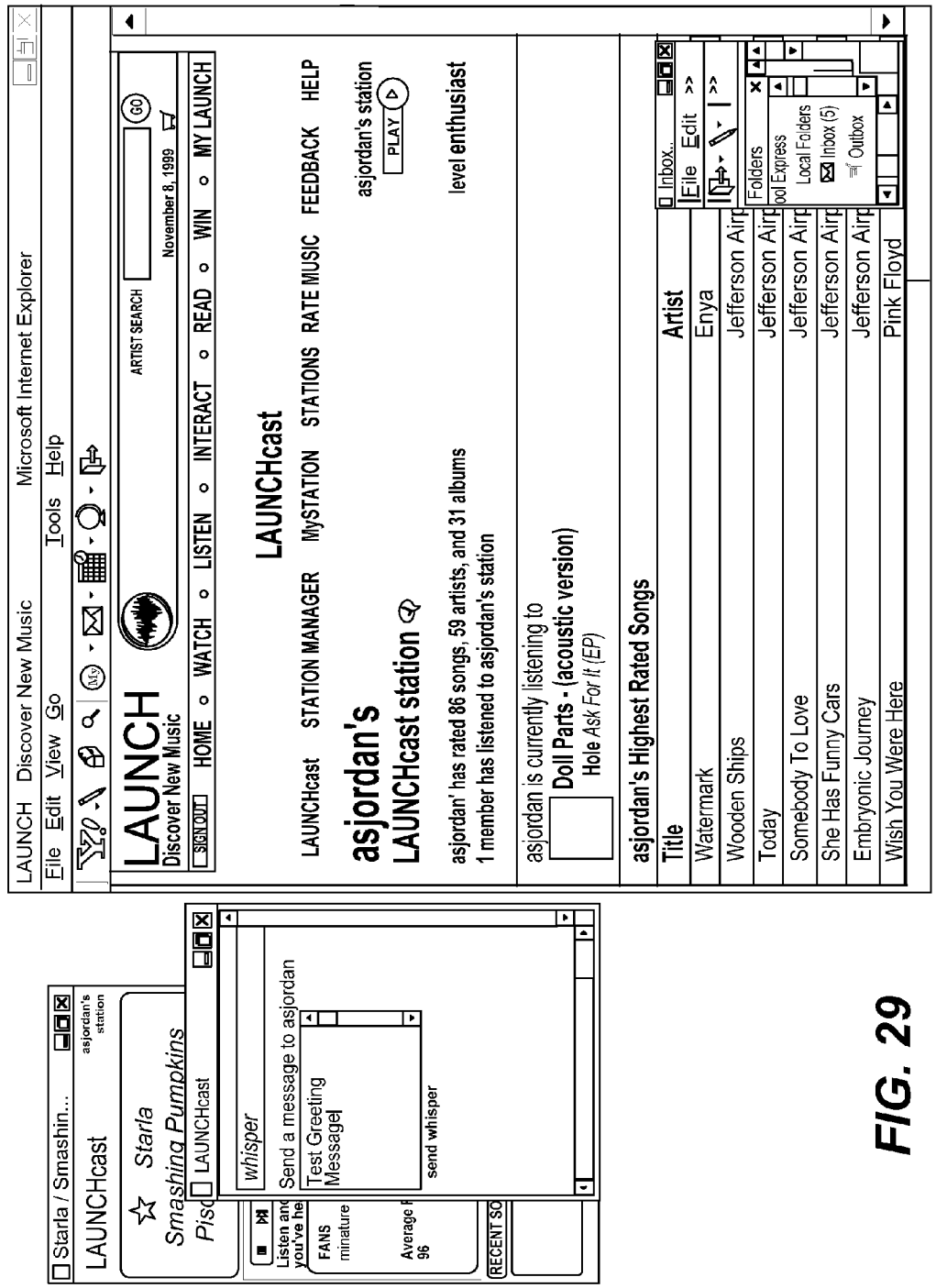
Figure 30:
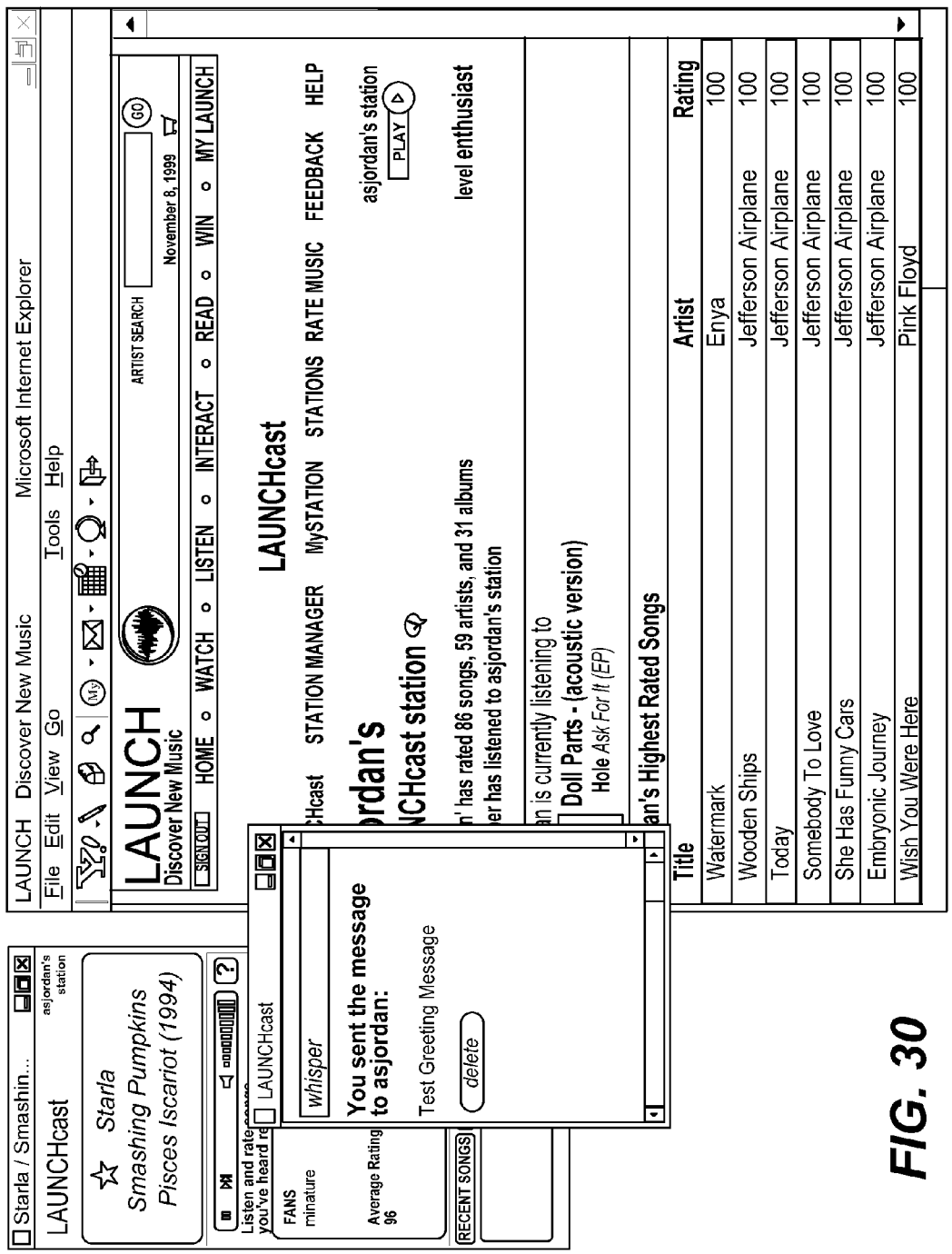

FIGS. 28-30 show the present invention window displays as background to a "whisper" or instant messaging, function enabling users to send messages to one another across the LAUNCHcast system. The left hand panel shows a "whisper" messaging window to send a message to asjordan. The w (whisper) bubble is displayed on the right next to asjordan's station. Thus in this example a user can select the whisper bubble for asjodran and then send an instant message to asjordan.

Figure 31:
FIG. 31 shows an initial data window display upon selecting the "TOP 100" link shown above and below the list of songs in FIG. 31 in accordance with an embodiment of the present invention.

FIG. 31 shows an initial data window display upon selecting the "TOP 100" link shown above and below the list of songs in FIG. 31. In this example the top 100 are compiled from all Launchcast stations. The number of plays may also be shown. The user may be invited to rate the song.

Generally, in order to promote interactivity and to take advantage of the new media that the Internet provides, the windows shown in the Figures contain ample internal hyperlinks that lead to web pages providing information regarding music, artists, and/or their works, web pages regarding other users of the system (as DJs or otherwise), and/or web pages regarding the user's control of the system (preferences, etc.).

The default paradigm for the user interface/player is to allow the user the greatest degree of freedom in expressing preferences and in obtaining that preference information regarding music artists, and their publications/albums. In this way, the user's experience is enhanced as he or she hears more of the music he or she likes. Access to purchasing web sites is also made available where users may purchase artists' works.

As an additional enhancement to the present invention, playlists from radio stations throughout the United States, and elsewhere, are made available so that playlists may be affected by such radio stations and by popularity of particular musical works (FIGS. 18 and 19).

II. Alternate Embodiments

Group 2

An exemplary list of components is now described in accordance with an embodiment of the present invention.

A. Rating Acceptor (RatingWidgetServlet)

This servlet takes HTTP requests to rate and get ratings for songs, albums and artists. When a rating is saved, it written to the ratings database and if the user who rated the item is designated as being in the ratings cache, the rating change is added to the queue of ratings updates.

In one embodiment, once every minute, the ratings updates are sent to all the ratings caches who have registered their IP address in the database. Every hour, the list of ratings caches are retrieved from the database. Every ten minutes, the list of users in the cache are retrieved from the database.

B. Song Information Cache (SongInfoCache)

In one embodiment a song information cache is a large in-memory cache of relatively static data that is used in playlist generation. In one embodiment it includes:

1) A list and hash table of all songs which includes identifying numbers, media formats available, average rating, artist and album information, explicit lyrics mark, genres the song is in and radio stations that play the song.

2) A hash table of artist information.

3) A hash table of album information.

4) A list and hash table of all ads including identifying numbers and media formats available.

5) A list and hash table of all news clips including identifying numbers and media formats available.

6) A list and hash table of all audio tips including identifying numbers and media formats available.

7) Lists of the 1000 most popular songs in each media format.

8) Lists of all songs in each genre.

9) A cache of frequently-accessed ratings profiles (RatingsCache).

In one embodiment the Song Information Cache is completely rebuilt once a day from the database.

C Ratings Cache (RatingsCache)

In one embodiment the ratings cache caches the entire ratings profile for the top 100 users who are known to be accessed frequently. On startup, it registers its IP address in the database to subscribe to ratings updates. These users are typically DJs that have a lot of subscribers or users who simply use LAUNCHcast frequently. Each ratings cache recalculates the most frequently accessed users and writes it to the database every 8 hours. At that time, the entire cache is disposed and reread from the database to erase any lingering corruption. Each ratings cache checks the database every 10 minutes for changes in the list of users to be cached and updates the ratings cache as appropriate.

For each user who is not in the ratings cache, their ID is appended to the list of users whose profiles need to be retrieved from the database. Users who are in the cache just immediately have their profiles added to the list of ratings to be returned to the PlaylistGenerator. All non-cached users' ratings are retrieved from the database, appended to the list of ratings, and returned to the PlaylistGenerator. The album and artist ratings are retrieved in a separate query from the song ratings. Each runs in its' own thread in parallel for optimal performance.

D Media gateway (MediaGatewayServlet)

In one embodiment the media gateway is a Java servlet that brokers the relationship between the end user's Windows Media Player, the database, and Windows Media Server and logs all media access. Because the client's Windows Media Player playlist (.asx file) does not contain any information about the actual songs or ads in the user's playlist, the media gateway in one embodiment contains the logic described below to redirect the user's player to the correct media address on the Windows Media Server:

1. For security reasons, the media gateway checks to see that the client is accessing it from the Windows Media Player client (and not a web browser or other application). If not, it redirects the user to an error media file.

2. Next, the media gateway pulls the user's ID off the query string and retrieves that user's playlist object from the database.

3. The gateway looks at timestamps in the playlist object that indicate when the user last heard an ad, tip, and song and figures out if it is time to insert an ad, tip, news item, or just play a song.

4. If the user has not heard an ad for a pre-defined period of time, the media gateway resets the ad timestamp and retrieves an ad path from the user's ad playlist and passes that mms redirect to the end user's Windows Media client. If no ad is available, it falls through to playing the next song in the user's playlist.

5. If it is not time to play an ad, the timestamp is checked to see if it is time to play a tip, then it follows the same logic as #4 to retrieve and play a tip, instead of an advertisement.

6. If it is not time to play an ad or tip, the timestamp is checked to see if it is time to play an audio news item, then it follows the same logic as #4 to retrieve and play an audio news item.

7. If it is not time to play an ad, tip, or news item (the usual case), the media gateway retrieves the path of the next song in the playlist and returns that address via MMS redirect to the client's Windows Media Player.

8. In all cases, the mediaID of the ad, tip, or song played is logged in the database under that user's ID. This logging information is used:
   a. To display what the user is listening to on the user's station page and under Who's Listening.
   b. As history data in the playlist generator.
   c. In calculation of the LAUNCHcast Top 100 chart.

E Playlist Generation

In one embodiment, when a user launches his player, an embedded Windows Media Player opens a call to our PlaylistGenerator Servlet (PlaylistGeneratorServlet). The expected output from this HTTP call is an ASX playlist file, which, in LAUNCHcast is list of pointers to a script that reads the actual playlist data object from the database.

The Playlist Generator Servlet parses the particular parameters for this playlist:

Object: GeneratorParameters.

userID: (required) the user for whom we're generating this playlist.

DJID: (default is userID) the user whose profile we will use to generate this playlist.

moodiD: (default is none) a mood (subset of profile) under which to listen (optional.

bandwidth: (default is 28.8 k, if not read from the user's preferences in the database) the bitrate that the user wishes to listen at.

We then check the database for an existing playlist (PlaylistStatus). If there already exists a playlist, we can use it if all the following are met: (PlaylistStatus.isStale( ))
   a. all the parameters (userID, DJID, etc) match.
   b. There are more than 8 songs left.
   c. The newRatingsCount (counter of new personalization data since last refresh) is <15.
   d. The playlist is less than a week old.

If all these are met, we simply reset the dates for the last time the user listened to an Ad, News bit, and Tip and resave the playlist. The ASX file is written out and Media Player takes off, making requests to the Media Gateway to play music.

4. If we cannot reuse an old playlist, we must create a new one with the PlaylistGenerator (PlaylistGenerator.create( )).

5. The first step is to get the user's preferences (PlaylistGenerator.getOptions( )).

We get the following options:

UnratedQuota: how much new (not rated) music they want hear in their playlist. The options here are 90, 80, 70, 50, 40, 30, and 20 percent. The default is 50 percent.

Explicit lyrics: Does this user want us to play music with explicit lyrics? True or False.

Bandwidth: if not already specified in the Generator Parameters, this is read. Current options are 28.8, 56, and T1/Lan. The default is 28.8 if a valid setting is none is found in the database.

6. Next we need to get a list of all the possible songs we can play (PlaylistGenerator.gatherMedia( )) as well as some other data about those songs. This is generally done using multiple threads running at the same time for better performance. The list of songs is held in hashtable (Population).
   a. The first thing we do is call the database to load a history of all the songs played for the user in the last 30 days. This is stored in the database as a long string, formatted as such: <Date>=<songiD>, <Date>=<songiD>, . . . " for performance reasons; reading one string from the database is faster than reading potentially several thousand rows individually from the database. Dates older than 30 days are ignored and the last time a song was played overwrites previous plays of a song. Each time a song is played via the Media Gateway, this string is appended. After the history loading is complete, a random integer is picked from 1 to 10. If the value is 1, we recreate the date and songiD string and rewrite it to the database. This cleans up songs that were played more than 30 days ago and duplicate entries for the same songiD.
   b. As the history loads as a thread, we make another database call to get the DJ's list of subscribed DJs, genres, and radio stations (PlaylistGenerator.getSubscriptions( )) for the specific mood they've requested. The result of this is three lists (DJs, genres, and stations).
   c. As soon as we have the subscriptions, we're ready to get ratings (GetRatings). This is also done in a thread. We pass the song hashtable, another hashtable that contains Artist and Album ratings (ItemsProfile), the DJ and the list of DJs to the GetRatings method. A list of users whose ratings we want to retrieve is compiled using the subscribed DJs and the DJ requesting the playlist, and a request is made to the ratingsCache to retrieve all these ratings (RatingsCache.getRatings( )). When the PlaylistGenerator has all the ratings, it is ready to assemble them into categorized data structures, based on the properties of each rating. It iterates through all the ratings and stores them as follows:

F Songs:

If the ID of the user is the DJ and the rating is 0 ('X' in the end-user interface), the song is added to song hashtable (Population) with a type of "Excluded", meaning it should never be played. The rating is also added to the average rating for songs by that artist.

If the rating is not 0, we immediately check the song information cache (SongInfoCache.get( )) for data about this song. If it does not exist in the cache, it is a song that was rated, but we do not have available for play (it's not encoded), it is immediately marked as an "Excluded" song.

If all of the above tests pass, we add the song to the song hashtable, with a type of "Explicit". We also include the rating in the calculation of this DJ's average rating of songs by the artist.

We add each song that is rated by subscribed DJs to the song hashtable and include the subscribed DJ's rating in the calculation of the subscribed DJ's average rating for this song.

G Albums:

We get the ratings profile for this album from the item rating profiles. If it doesn't exist yet, retrieve the data and create it.

If the rater is the user requesting the playlist, we set the rating for this item to the user's rating.

If the rater is a subscribed DJ, we add the rating to the DJ average for this album.

H Artists:

The same as for albums, except we discard any ratings made for the artists listed as "Various Artists", "Soundtrack", or "Original Soundtrack".

d. We then add the top 1000 most popular songs (PlaylistGenerator.getPopular( )) in the bandwidth type specified to the song candidate hashtable. This popular list is maintained in the song information cache. Before each song is added to the song hashtable, we check to see if it's already in the candidate hashtable (put there by another query), and if so, we check to make sure it shouldn't be "Excluded", or discard it. If we add the song, it is added under the type is "Unrated".

e. We add a maximum of 5000 songs picked randomly. (PlaylistGenerator.getR.andom( )). To do this, we first count the number of songs contained in each all of the genres a user has selected (SonginfoCache.countInGenres( )). Songs may be in multiple genres. We then divide the number of songs by the total number of songs in the song information cache. If this is less than 5%, we pick songs directly from a list of songs only in those genres. Otherwise we can pick randomly from all songs. We do this calculation to avoid the situation where a user has selected a small number of genres and picking randomly will return only a few songs that are allowable to play when considering their genres.

To select only from selected genres:

Determine the total number of songs to pick (totalToPick) from the lesser of 5000 and the total number of songs in the selected genres.

For each genre, get a copy of the list of songs in that genre from the song information cache (SonginfoCache.getInGenre( )).

Determine the number of songs to pick from each genre from this formula: songs to pick=totalToPick*(number of songs in this genre I total number of songs in the selected genres).

We pick the determined number of songs, and try to add it to the song hash table with a type of "Unrated". The song is not added if it is already in the hash table.

To select from all songs we simply select a random song 5000 times. Each time, we try to add the song if it is not already there, as described above.

f. Once we're done adding random songs, we wait until all the ratings are retrieved and we have all the dates of when songs were played for the user.

8. Now we finally get close to picking songs for the playlist. First off, we take the explicit, implicit, and unrated lists built in the last step and order them in descending order by score using a quicksort algorithm.

9. Then we figure out how many songs from each list to pick. As an example, assume the size of a playlist is 50 songs.

If the user is listening to their own station, use the following formula:

If the user's list of explicit and implicit songs is smaller than 100 songs, we must pick 90% of the songs from the unrated list to avoid playing their rated songs too much. Set their unrated quota to 90. Otherwise, use the unrated quota from their options.

The maximum number of songs we can pick from the explicit and implicit lists is: maxiumumRated=playlistSize*(100−unratedQuota)*0.01.

The maximum number of songs we can pick from the explicit list is: maximumExplicit=number of songs in the explicit list*0.20.

The number of songs to pick from the explicitly-rated list is then: explicitToPick=playlistSize*(100−unrated quota)*0.01*(number of songs in the explicit list I sum of explicit and implicit songs)*3).

The number of implicit songs is simply: implicitToPick=maximumRatedexplicitToPick.

We then check to make sure we haven't picked more explicit songs than maximumExplicit and no more implicit songs than are in the implicit list.

The unrated songs are simply then: playlistSize−(explicitToPick−implicitToPick).

If the user is listening to a station other than their own and the number of songs in the explicit and implicit list total greater than 200:

explicitToPick=Minimum(playlistSize*0.50,20% of explicit songs)

implicitToPick=Minimum(playlistSize,#of implicit songs)−explicitToPick.

If for some reason we did not get playlistSize songs from this calculation, we pick a third of the songs from each of explicit, implicit and unrated, making sure not to pick more than 20% of the rated and unrated lists.

As a fallback, if none of the methods above to calculate the number of songs to pick worked, we pick a third of the playlistSize from each list, making sure not to pick more than 20% of the rated and unrated lists.

10. Copy the list of albums and artist from and by which songs have been played for this user in the last 3 hours.

11. Pick the songs for this playlist. (PlaylistGenerator.pickSongs( ))

First, make a list of all the picks we need to make (PickList). For example, if we have a playlist of 50 songs, the list may contain 10 entries for explicit songs, 20 for implicit songs, and 20 for unrated songs.

While there are still songs to pick, iterate through this cycle:

a. randomly pick a song list type (explicit, implicit, unrated) with a probability based on the proportion of songs to come from each list.

b. pick a random song index from that list (which has already been sorted in descending order of score), based on the following formula (SongGroup.pickRandom( )):

sizeOfList=the number of songs in this list random=a randomly-chosen number between 0 and (sizeOfList−1)+0.01 index of song to pick= ((rand$A7$)$I$sizeOfList−1$A7$)*(sizeOfList−1))

This formula allows us to pick songs somewhat randomly, while guaranteeing a high probability that the song picked will come from highest scored. The higher the ranking of the song in the score matrix, the higher the probability it will be picked. This algorithm scales well for any size of list because it is rank-based, not just score based.

The song at that index is removed from the list. If for some reason we do not get a valid song (possibly the song list already exhausted), add another song to the list of types to pick of this type.

Once we have picked a song, get its album and artist information.

If the artist is not a "Various Artist" and the sum of the number of songs played by this artist and already picked for this playlist by this artist is greater than or equal to 3, we cannot play this song by the RIAA rules. We mark it as "rejected" and add another song to the list of songs to pick from the same list this song was picked from.

The same test is performed for albums, with the maximum played being 2.

If the song was picked successfully and was within legal boundaries, increment the number of songs picked from this album and by this artist. Add the song to the final list of songs for the playlist and mark the order in which this songs was picked for the playlist.

12. If for some reason we did not get playlistSize songs, delete the existing playlist, add popular songs to the song hashtable, resort the song lists, and pick, ignoring the user's genres selections.

13. Pick news clips. This is done simply by picking a specific number of unique news items that are in the specified bandwidth format. A list of available news clips is stored in the song information cache.

14. Pick ads. This is done exactly the same as news, with a different number of ads to pick.

15. Pick tips. This is done exactly the same as news, with a different number of tips to pick.

16. Randomly shuffle the order of the songs in the playlist.

17. Serialize the playlist and save it to the database.

18. Return the ASX file to Windows Media Player.

19. Every 5 minutes, the Flash player "pings" the Playlist-Generator again. If the playlist is stale or has 8 songs or less left in it, it regenerates the playlist and replaces the one previously saved in the database.

III. Alternate Embodiments

Group 3

Additional embodiments and an exemplary user interface specification are now described.

A. Player UI Specification

Size: In one embodiment the size of the player user interface may be made small enough that the user can keep it open while using other applications.

Browser: In one embodiment no client download is required.

An exemplary player window may include the following feature for an expandable window for video and chat is illustrated in FIG. 32. It includes: an audio section, a video section, a user's window, and a chat window. The audio section contains basic player functionality. The video window expansion displays video when in a video mode. The user's window shows who's listening to the same content. The chat window supports typing and viewing chat. A status bar may illustrate Personalizing your Launchcast In one embodiment, an exemplary set of features of the player includes:

A) Play/pause button
B) Skip song
C) Volume control
D) Prominent rating widget
1) Shows current explicit rating
2) Shows implicit rating (and source) when explicit one not present
3) Shows other songs with same rating value (when user puts mouse over a rating value)
4) Graphically shows community popularity (average rating) and ranking, where appropriate
5) Gives rewards when user rates item
E) Current song title (linked to song page)
F) Artist (linked to artist page)
G) Album (linked to album page)
H) Link to fans of the song (ordered by rating and online status)
I) Area to display text tips and factoids
J) Small image advertisement In one embodiment a [VIDEO>] button appears active when video is available. It expands the window and starts video, otherwise it links to a video section In one embodiment a [CHAT>] button allows a user to open and close chat interface on community LAUNCHcasts. The button appears active when digital download is available. It downloads in a separate window, otherwise links to downloads section.

In one embodiment a [RATE MORE] button is linked to a list of more songs to rate.

In one embodiment a [BUY] button is linked to an album/single commerce page.

In one embodiment an [OPTIONS] button is linked to LAUNCHcast options.

In one embodiment a [HELP] button is linked to a player tutorial.

In one embodiment all of the links many open in the same target window.

B. Media Gateway

In one embodiment the Media Gateway is accessed via HTTP and used to play a song in LaunchCast 2.0. It performs a number of tasks and if all criteria are met, streams out a media file (audio or video). This program can be written in TCL for StoryServer or could be a compiled program in Java or C++ if performance requires.

Tasks

An exemplary set of tasks for the media gateway is now described.

1. Check cookies for valid Launch login credentials. In the case of an error, play an audio clip that asks the user to log in.

2. Checks the USER_AGENT HTTP header to make sure a user isn't trying to download a file with a browser. If the check fails, redirect to http://www.launch.com.

3. Write out the HTTP headers including an expires header and MIME type appropriate for the media.

4. Open the file for reading in binary mode.

5. Select the top 1 song from in the the playlist by ordinal in the playlist from the database. Delete the row in the database. Look up its file name and path. If either of these last two tasks fails, exit.

6. Call the stored procedure OnPiayStart. Close the database connection. Ignore errors.

7. Read the file from disk and write it out as raw data to the client. In the case of an error, exit.

8. When finished, call the stored procedure OnPlayEnd. Ignore errors.

C. Flash Player Interface

As an overview, in one embodiment the LAUNCHcast player comes in two flavors: HTML and Flash. This section details the communication between the flash player, the HTML page, and Media Player.

Initialization

To start the flash player, the flash player code is embedded in a StoryServer page.

In one embodiment the player will at first display "Personalizing . . . " while the Media Player embedded in the page waits for the Playlist Generator to return an ASX file. As soon as the ASX file is available, the Media Player will start playing and send a JavaScript event. The page catches this event and calls changeRatee which sets variables in the active motive and makes a call to update the player. If necessary, the page can also manually change the state of the flash player by putting it in the various modes (playing, paused, stopped).

As play continues, each new song that is played will call changeRatee and change the information displayed in the player.

JavaScript Functions:

An exemplary set of JavaScript Functions is now described.

changeRatee (artistname, album_name, song_name, artislid, album_id, disc_no, track_no). The changeRatee function sets variables on the flash player and then tells the player to update. All variables are passed to the player as their variable names playerControl (action, message). The playerControl function forcefully changes the display state of the player. An action can be one of 'playing', 'paused', 'stopped', or 'error'. A message can display a minimum of 20 characters in the player, more depending on the characters.

Variables:

An exemplary set of variables is now described. Note that passing a value of −1 is equivalent to not passing a value at all.

album_id: The ID of the album which the currently playing song is on. It includes:
values: integer
init: not passed
changeRatee: optional album_url: The URL to which a browser window opens when a user clicks on the album title in the player window. The album_id should be appended to it like this:
≤album_url>?albumID=<album_id>
The album URL includes:
values: a valid HTTP URL
init: required
changeRatee: not passed artist_id: The ID of the artist of the song which is currently playing
The artist ID includes:
values: integer
init: not passed
changeRatee: optional artist_url: The URL to which a browser window opens when a user clicks on the album title in the player window. The artist_id should be appended to it like this:
≤artist_uth?artistID=<artist_id>
The artist URL includes:
values: a valid HTTP URL
init: required
changeRatee: not passed bds_url: The URL to which a browser window opens when a user clicks on "Your Radio Stations" in the player
values: a valid HTTP URL
init: required
changeRatee: not passed bds_playlist_url: The URL to which a browser window opens when a user clicks on a radio station listed under "Your Radio Stations" in the player.
The query string should be appended to like this:
<bds_playlist_url><bds_id>
values: a valid HTTP URL
init: required
changeRatee: not passed buy_url: The URL to which a browser window opens when a user clicks on a buy button. The album_id should be appended to the query string like this:
<buy_url>?albumiD=<albumiD>
values: a valid HTTP URL
init: required changeRatee: not passed
change_station_url: The URL to which a browser window opens when a user wants to listen to a different mood or station.
values: a valid HTTP URL
init: required
changeRatee: not passed disc_no: The disc number of the album from which the currently playing song is on. Used only for retreiving the songiD.
values: single digit
init: not passed
changeRatee: optional dj_id: Specifies the id of the user station being listened to
values: integer
init: required
changeRatee: not passed dj_name: Specifies the name of the station being listened to
values: integer
init: required
changeRatee: not passed djs_url: The URL to which a browser window opens when a user clicks on "Your DJ's ratings" in the player.
values: a valid HTTP URL
init: required
changeRatee: not passed fans_url: The URL to which a browser window opens when a user wants to see a list of more fans for a song
values: a valid HTTP URL
init: required
changeRatee: not passed
The songiD may be appended to the query string like this:
<fans_url>?type=4&songiD=<songiD> help_url: The URL a browser window should open up to when a user click the help button on the player.
values: a valid HTTP URL
init: required
changeRatee: not passed init_url: The URL to call to grab player initialization data. For now, this returns only relative ratings data. It returns a series of values where <n> is a unique rating value. Not all rating values between 0 and 100 will be returned. &loaded=1 will also be returned.
values: a valid HTTP URL
init: required
changeRatee: not passed
rater should be appended to the query string like this:
<init_url>?rater=<rater>
Return Value Examples:
song_rating_song_id<n>—the id of song rated n
song_rating_artistid<n>—the id of the artist who performed the song rated n
song_rating_artist_name<n>—the name of the artist who performed the song rated n
song_rating_song_name<n>—the name of the song rated n
artist_rating_artist_id<n>—the id of the artist rated n
artist_rating_artist_name<n>—the name of the artist rated n
album_rating_album_id<n>—the id of the album rated n
album_rating_album_name<n>—the name of the album rated n
album_rating_artistid<n>—the id of the artist who performed the album rated n album_rating_artist_name<n>—the name of the artist who performed the album rated n launch_url: The URL a browser window should open up to when a users clicks on the LAUNCH logo on the player.
  values: a valid HTTP URL
  init: required
  changeRatee: not passed manager_url: The URL a browser window should open up to when a users clicks on the station manager button in the player.
  values: a valid HTTP URL
  init: required
  changeRatee: not passed member_url:
  values: a valid HTTP URL
  init: required
  changeRatee: not passed The URL a browser window should open up to when a username (fan or dj for example) is clicked on. The userID must be appended to the query string like this:
  <member_url>?userID=<userID> mode: Specifies what mode the player is in. This is a placeholder awaiting further specification on different functionality for the modes.
  values: "audio" or "video"
  init: required
  changeRatee: not passed ping_interval: The number of seconds to wait between making requests to the ping_uri. If not passed on init, default to 600.
  values: integer>0
  init: optional
  changeRatee: not passed ping_url: A URL to make a request to at a given interval (ping_interval). The responding page does not need to return any data. Pinging starts after first waiting one ping_interval. If it is not passed, do not ping.
  values: a valid HTTP URL
  init: optional
  changeRatee: not passed The parameters should be appended to the query string like this:
  <ping_url>?u=<rater> playlist_review_url: A URL to open a browser window to when the user wishes to review (and rate) songs they have listened to recently.
  values: a valid HTTP URL
  init: required
  changeRatee: not passed ratee: The ID of the song or video we are currently playing. If this is not passed on changeRatee, the player must use the song_info_url to retreive it.
  values: integer
  init: not passed
  changeRatee: optional rater: The ID of a rater (a userID in this case) and the user who is currently using this player.
  values: integer
  init: required
  changeRatee: not passed rate_url: The URL to use to communicate with the rating servlet for getting ratings, submitting new ratings, etc.
  values: a valid HTTP URL
  init: required
  changeRatee: not passed skip_url: The URL to make a request to when the skip button is pressed on the player. This marks this song as skipped in the database. The parameters should be appended to the query string like this:
  <skip_url>?userID=<rater>?mediaID=<mediaID>
  values: a valid HTTP URL
  init: required
  changeRatee: not passed song_lookup_url: The URL to use to obtain the songiD, rating, and other song information. The parameters should be appended to the query string like this:
  <song_lookup_url>?rater=<rater>&volume=<volume>&djiD=<djid>&djName=<dj_na m e>
  values: a valid HTTP URL
  init: required
  changeRatee: not passed The volume should be the last volume setting if it has changed since the last call to song_lookup_url, or −1 otherwise. If −1, the volume will not be saved.

It returns the following data:
  song_id—the ID of the song requested
  song_name—the title of the song
  artist_name—the name of the artist who performed this song
  artist_id—the ID of artist who performed this song
  album_name—the name of the album this song is from
  album_id—the ID of the album this song is from new—indicates if this song is new to LAUNCHcast
  popular—indicates if this song is popular among LAUNCHcast DJs
  exclusive—indicates if this song is exclusive to LAUNCH
  last_played—a string representing the date this song was last played for this user
  fan_id<n>—the userID of a user who is a fan of this song. If there are more than a certain number this will be 0, prompting to stop and display a more button
  fan_name<n>—the alias of a user who is a fan of this song. If there are more than a certain number, this will be . . . more . . . ", prompting to stop
  radio_id<n>—the station ID of a radio station that plays this song
  radio_name<n>—the station name of a radio station that plays this song
  fan_online<n>—1 if the user is online, 0 otherwise
  dj_rating_id<n>—the userID of a dj who rated this song
  dj_rating_name<n>—the name of a user who rated this song
  dj_rating_value<n>—the value of the rating a dj gave this song
  dj_rating_online<n>—1 if this dj is online, 0 otherwise
  image_url—the URL of the image to display for this song
  origin—a text description of how this song was put in the playlist
  ticker_text—the text to display in the ticker window
  song_rating—the rater's current rating of this song
  song_rating_type—1 if the song rating is explicit, implicit otherwise
  album_rating—the rater's current rating of album this song is on
  album_rating_type—1 if the album rating is explicit, implicit otherwise
  artist_rating—the rater's current rating of the artist who performed this song
  artist_rating_type—1 of the artist rating is explicit, implicit otherwise
  media_id—the mediaID of this song An example return string is as follows:

```
song_id=9806650&song_name=One&artist_name=U2&artist_id=90900&album_
name=Zooropa&album_id=8759&new=O&popular=1&exclusive=O&last_played=9808655&fan_id1=
13302&fan_name1=HitsMan&fan_id2=6474162&fan_name2=boulter&dj_rating_id1=13302&dj_rating_
name1=Hitsman&dj_rating_value1=78&dj_rating_id_2=6474162&dj_rating_name2=boulter&dj _rating_
value2=65&image_url=http://www.launch.com/images/87980.jpg&origin=Your+rating+for+this+song
``` song_url: The URL to which a browser window opens when a user clicks on the song title in the player window. The ratee should be appended to the query string like this:
<song_url>?songID=<ratee>
values: a valid HTTP URL init: required changeRatee: not passed
If the ratee isn't available, alternative parameters can be passed:
<song_url>?eval=1&album=<album_id>&disc=<disc_no>&track=<track_no>
track_no: The track number of the currently playing song. Used only for retreiving the songID.
values: integer
init: not passed
changeRatee: optional
vol_level: The initial volume level for the player. If not passed on init, set to 50.
values: real number between 1 and 100
init: optional
changeRatee: not passed
window: The target name of the windows that information not displayed in the player itself is displayed in. If not specified on init, use 'launchcast_player_info'
values: string of non-zero length
init: optional
changeRatee: not passed D. Playlist Creator An embodiment of a playlist creator will now be discussed.

The user's player preferences are retrieved (including audio/video options).

The system gets the ratings data.

In one embodiment ratings are scaled from the album and artist 1-7 scale to a 0-100 scale for songs. This is independent of the interface; we may still show 1-7 in the song rating widget. This gives us a lot of flexibility for changing the rating scale in the future however. The mapping from the old scale to the new is as follows in FIG. 33. In one embodiment, the higher the rating, the more often a song will be played. A rating of 0 means the song will never be played again for a particular user.

If this is the first time a user has used LaunchCast 2.0, their album and artist ratings are propagated down to song ratings. When LaunchCast 2.0 is released, stored procedures will be added to the back end of both the album and song rating widgets so all those ratings are propagated to song ratings.

Note that for video playlists, the selection will be among only those songs with videos available.

In one embodiment, a data retrieval process for computing scoring information for playlist creation includes:

1) Retrieve user's explicit song ratings;
2) Retrieve user's implicit album->song ratings and populate implicit rating matrix, where we don't have an explicit song rating;
3) Retrieve user's implicit artist->song ratings and populate rating matrix, where we don't have an explicit song rating or album->song rating;
4) Retrieve average rating from user's DJs for all songs rated by their advisors and populate rating matrix;
5) Retrieve and scale user's implicit BDS playlist->song ratings and populate rating matrix
6) Retrieve and scale user's venue->artists->song ratings and populate rating matrix (note: we will retrieve a maximum of 50 artists across all venues, so retrieve 50/venue memberships artists from each venue.) If a song is present in any venue, it receives a score of 100 for the implicit venue rating
9) Retrieve and scale user's song recommendations from NetPerceptions and populate rating matrix
10) Retrieve community average rating for all songs in the rating matrix and add to matrix
11) Retrieve last played and scale time since played logarithmically on a scale of 1 to 100.

Referring to FIG. 34, a weight matrix is shown. A score is computed by multiplying a rating matrix by weight matrix to compute a score. Note that when MyDJs average doesn't exist, the community average is used as MyDJs average. FIG. 35 illustrates a user profile matrix for a user/DJ HitsMan. FIG. 36 shows an associated weight matrix and FIG. 37 shows a score matrix.

In one embodiment, songs may be sorted by explicit ratings by rating (descending). Additionally, songs may be sorted by implicit ratings by score (descending). In one embodiment, while songCount<playlistLength, choose songs biased towards top of both lists, based on user's unrated quota proportions In one embodiment a determination of which songs are put into the playlist is done with the following formula, with:
f=user determined integer between 1 and 100. The higher the exponent, the more songs are chosen from the top of the list.
ls=number of songs in list
r=random number between 0 and ls (generated each time)
array index of song to pick=$(r^f)/(ls^f)*ls$ An additional procedure may be used to enforce legal rules for copyright compliance (may be different for video). In one embodiment, if the artist of the song chosen has less than 4 songs in this playlist and there are less than 3 songs from this album in the playlist, remove the song from the list add it to the playlist. Otherwise, remove this song from the list and choose again.

The songs of the playlist may be shuffled and then written to a playlists table.

In one embodiment, an ASX file is returned with entries as an infinite repeat of the file streaming URL with the userId and playlistId as a parameters (e.g. http://stream.launch.com/stream.xxx?userid=51066&playlistid=3487)

IV. Alternate Embodiments, Group 4

Example 1

In one example, a method of broadcasting data streams through a computer network to a user's computer includes: providing a database of data streams; selecting a data stream according to a selection method; transmitting one of said data streams to the user's computer; receiving feedback expressing a preference from the user regarding the transmitted data stream; and updating said selection method to better reflect the preference of the user; whereby data streams transmitted to the user are biased according to the preference.

Example 2

The method of example 1, further comprising: the selection method including generating a list of data streams to transmit to the user's computer, transmitting one of the listed data streams to the user's computer, and updating the list of data streams to better reflect the preference of the user, whereby data streams transmitted to the user are biased according to the preference.

Example 3

The method of example 1, further comprising: receiving feedback expressing preferences from sources other than the user.

Example 4

The method of example 3, where the step of receiving preferences from sources other than the user further comprises: receiving feedback expressing preferences from the group consisting of other users, commercial users, commercial radio stations, and lists of popular songs.

Example 5

The method of example 1, further comprising: informing the user generally regarding the database and the data streams, querying the user as to data stream preference prior to generating an initial transmission list of data streams, whereby the initial list reflects general preferences of the user.

Example 6

The method of example 1, wherein the data streams are selected from the group consisting of songs and videos.

Example 7

The method of example 1, wherein said transmitted data stream is removed from the transmission list.

Example 8

The method of example 7, wherein the data stream removed from the transmission list is listed on a transmitted data stream list.

Example 9

The method of example 1, wherein the step of transmitting one of the data streams further includes transmitting one of the data streams in conformance with applicable copyright law.

Example 10

The method of example 9, where the conformance with applicable copyright law applies to all transmitted datastreams.

Example 11

A data stream system for providing data streams to a user, including: a connection to a computer network; the computer network connected to a computer of the user; a database of data streams, the database available to the computer network; a data stream controller, the data stream controller transmitting data streams to the user's computer according to a selection program; a user interface, the user interface coupled to the user's computer and receiving the data streams for the user and providing a feedback mechanism for the user so that the user may indicate a preference regarding data streams transmitted by the data stream controller; the selection program receiving indications from the user, the selection program modifying its selection of data streams for transmission to the user's computer according to the user's preference; whereby data streams selected by the selection program are biased according to the user preference.

Example 12

The system of example 11, wherein the computer network comprises the Internet.

Example 13

The system of example 12, wherein the database is a song database and the data streams are songs.

Example 14

The system of example 11, wherein the database is a music video database and the data streams are music videos.

Example 15

The system of example 11, wherein the user interface comprises an electronic media player.

Example 16

The system of example 15, wherein the electronic media player is selected from the group consisting of RealPlayer, Apple QuickTime, and Windows Media Player.

Example 17

The system of example 11, wherein the selection program creates a list of data streams for transmission to the user.

Example 18

The system of example 17, wherein the selection program modifies the list of data streams for transmission to the user according to the user preference.

Example 19

The system of example 11, further comprising: the data stream controller transmitting the data streams in compliance with copyright law.

Example 20

The example of claim 19, further comprising: the data stream controller transmitting all data streams in compliance with applicable copyright law.

Example 21

A user interface for an Internet datastream transmission system, including: a media player for playing data streams; a rating tool, the rating tool indicating a rating for a data stream currently played by the media player; and a data stream information display, the data stream information display displaying information for the data stream currently played by the media player; whereby a user can indicate a preference regarding the data stream currently played by the media player.

Example 22

The user interface of example 21, further comprising: a playlist generator, the playlist generator generating playlists of data streams for the media player, the playlist generator selecting data streams according to preferences indicated by the user.

Example 23

The user interface of example 22, further comprising: the data streams selected by the playlist generator being in compliance with applicable copyright law.

What is claimed is:

1. A method of providing an Internet radio service by crowdsourcing the generation of Internet radio stations, comprising:
    receiving requests from a plurality of individual users, in a community of users, to serve as DJs for the community by creating personalized Internet radio stations shared with the community of users, each individual user serving as a DJ by providing at least one musical preference from which a personalized Internet radio station is generated to form a plurality of shared personalized Internet radio stations;
    hosting the plurality of shared personalized Internet radio stations via a network service including a database and at least one server computer;
    receiving a request from a member of the community selecting an individual one of the plurality of shared personalized Internet radio stations; and
    transmitting a data stream providing access to songs of the selected shared personalized Internet radio station to the member of the community.

2. The method of claim 1, further comprising providing, to an individual user, a listing of recommended shared personalized internet radio stations.

3. The method of claim 2, further comprising providing a search user interface for a user to search for shared personalized Internet radio stations.

4. The method of claim 1, further comprising providing a listing of recommended DJs.

5. The method of claim 4, further comprising providing a listing of top DJs.

6. The method of claim 1, further comprising displaying a DJ image for the selected shared personalized Internet radio station.

7. The method of claim 1, wherein the at least one server computer includes at least one of a media server, a streaming server, a HTTP server, and a central server.

8. The method of claim 1, wherein the at least one musical preference of at least one of the plurality of shared personalized Internet radio stations includes a genre selection.

9. The method of claim 1, wherein the at least one musical preference of at least one of the plurality of shared personalized Internet radio stations includes a mood selection.

10. The method of claim 1, wherein the at least one musical preference of at least one of the plurality of shared personalized Internet radio stations includes an artist preference.

11. The method of claim 1, wherein the at least one musical preference of at least one of the plurality of shared personalized Internet radio stations includes a rating of at least one song.

12. The method of claim 1, wherein each of the personalized Internet radio stations has songs picked with the selection of songs adapted over time to pick new songs to prevent repetitively playing the same song playlist.

13. The method of claim 12, wherein the selection of songs to prevent repetitively playing the same song playlist includes at least one of a rule to pick new songs and an element of randomness to pick new songs.

14. The method of claim 12 wherein the selection of songs to prevent repetitively playing the same song playlist includes generating a playlist, regenerating the playlist to create a new playlist, and discarding the old playlist.

15. The method of claim 1, where songs of the selected shared personalized Internet radio station are picked to include songs not specified in the respective user musical preference and the song selection is adapted over time to prevent repetitively playing the same song playlist.

16. A method of providing an Internet radio service via crowdsourcing, comprising:
    receiving requests from a plurality of different users to create personalized Internet radio stations, each respective request including at least one musical preference to generate a personalized Internet radio station in which songs are picked to include songs not specified in the respective request;
    in response to each request, generating for each individual different user a personalized Internet radio station based on the at least one musical preference of the individual different user;
    providing an option for each individual responsible for generating a personalized Internet radio station to share a respective personalized Internet radio station with a community of users; and
    hosting, via at least one server computer, a plurality of shared personalized Internet radio stations, wherein an individual shared personalized Internet radio station is accessible by members of the community of users; and
    in response to a request from a member of the community selecting one of the plurality of shared personalized Internet radio stations, transmitting a data stream providing access to songs of the selected personalized Internet radio station to the member of the community.

17. The method of claim 16, further comprising providing, to an individual user, a listing of recommended shared personalized internet radio stations.

18. The method of claim 17, further comprising providing a search user interface for a user to search for shared personalized Internet radio stations.

19. The method of claim 16, further comprising providing a listing of popular shared personalized Internet radio stations.

20. The method of claim 16, further comprising associating a DJ name with an individual responsible for creating a shared personalized Internet radio station.

21. The method of claim 20, further comprising providing DJ information for an individual shared personalized Internet radio station.

22. The method of claim 20, further comprising providing a listing of recommended DJs.

23. The method of claim 20, further comprising providing a listing of top DJs.

24. The method of claim 20, wherein the DJ information includes a DJ image.

25. The method of claim 16, wherein the at least one server computer includes at least one of a media server, a streaming server, a HTTP server, and a central server.

26. The method of claim 16, wherein each of the personalized Internet radio stations has songs picked with the selection of songs further adapted over time to prevent repetitively playing the same song playlist.

27. The method of claim 26, wherein the selection of songs to prevent repetitively playing the same song playlist includes at least one of a rule to pick new songs and an element of randomness to pick new songs.

28. The method of claim 26 wherein the selection of songs to prevent repetitively playing the same song playlist includes generating a playlist, regenerating the playlist to create a new playlist, and discarding the old playlist.

\* \* \* \* \*